United States Patent [19]

Hioki et al.

[11] Patent Number: 5,958,665

[45] Date of Patent: *Sep. 28, 1999

[54] SULTONE COMPOUND, QUATERNARY SALT COMPOUND AND METHINE COMPOUND, PRODUCTION PROCESS THEREOF, AND SILVER HALIDE PHOTOGRAPHIC LIGHT-SENSITIVE MATERIAL CONTAINING THE QUATERNARY SALT COMPOUND AND/OR METHINE COMPOUND

[75] Inventors: Takanori Hioki; Tetsuya Watanabe, both of Kanagawa, Japan

[73] Assignee: Fuji Photo Film Co., Ltd., Kanagawa, Japan

[*] Notice: This patent is subject to a terminal disclaimer.

[21] Appl. No.: 08/943,157

[22] Filed: Oct. 3, 1997

[30] Foreign Application Priority Data

Oct. 4, 1996 [JP] Japan ..................................... 8-264648
Oct. 4, 1996 [JP] Japan ..................................... 8-264649

[51] Int. Cl.$^6$ ...................................................... G03C 1/12

[52] U.S. Cl. ........................... 430/581; 430/582; 430/583; 430/584; 430/585; 430/600; 430/613

[58] Field of Search ...................................... 430/584, 585, 430/581, 583, 582, 600, 613

[56] References Cited

FOREIGN PATENT DOCUMENTS 1077611  4/1965  United Kingdom .

*Primary Examiner*—Thorl Chea
*Attorney, Agent, or Firm*—Sughrue, Mion, Zinn, Macpeak & Seas, PLLC

[57] ABSTRACT

A sultone compound represented by formula (I) or (I'), a quaternary salt compound represented by formula (II) or (II'), a methine compound represented by formula (III) or (III'), production processes thereof and a silver halide photographic light-sensitive material comprising a quaternary salt compound represented by formula (II) or (II') and/or a methine compound represented by formula (III) or (III') are disclosed.

2 Claims, No Drawings

SULTONE COMPOUND, QUATERNARY SALT COMPOUND AND METHINE COMPOUND, PRODUCTION PROCESS THEREOF, AND SILVER HALIDE PHOTOGRAPHIC LIGHT-SENSITIVE MATERIAL CONTAINING THE QUATERNARY SALT COMPOUND AND/OR METHINE COMPOUND

FIELD OF THE INVENTION

The present invention relates to a methine compound useful as a coloring agent, a light absorbent, an optical disc dye, a spectral sensitizing dye of silver halide photography or electrophotography or a medicine, to a sultone and a quaternary salt compound as the starting materials of the methine compound, and to a process for producing these compounds. The present invention also relates to a silver halide photographic light-sensitive material comprising a quaternary salt and/or a methine compound.

BACKGROUND OF THE INVENTION

Compounds capable of absorbing light in the visible region provide various colors according to the wavelength of the light absorbed. These compounds are also called a dye or a dyestuff and used for coloring various materials. Their use in high-level technology includes a dye for an optical disc which is a high-density information recording material, a spectral sensitizing dye of silver halide photography or electrophotography which are an image information recording material, and a filter dye. Further, in recent years, their medicinal use in phototherapy is attracting attention.

The dyes used as described above are in many cases formed into a solution and then worked to form a desired state. Accordingly, they are required to have excellent solubility. Further, in the case when the dyes are used as a dye for optical disc or as a spectral sensitizing dye, a solid state or an adsorbed state is formed and therefore, different from the solution state, the properties as a molecular aggregate greatly participate in the performance. A slight change of the molecular structure very commonly gives large effects on the solubility or formation of a molecular aggregate.

Methine compounds having a partial structure comprising a heterocyclic ring having several sulfoalkyl groups are known. As the sulfoalkyl group, a 2-sulfoethyl group, a 3-sulfopropyl group, a 4-sulfobutyl group and a 3-sulfobutyl group are well known. With respect to the sulfoalkenyl group, only two groups are known in British Patent 1,077,611. The difference in the structure of the substituent affects the solubility or formation of a molecular aggregate of the above-described dyes. Accordingly, to develop new sulfoalkenyl groups may achieve more variation of the properties of the methine compound and is very expected.

On the other hand, an enormous number of efforts have been conventionally made to achieve high sensitivity of silver halide photographic light-sensitive materials. The sensitizing dye used for the spectral sensitization is known to have large effects on the capability of the silver halide photographic light-sensitive material. A slight difference in the structure of the sensitizing dye greatly affects the photographic capabilities such as sensitivity, fog and storage stability, however, to foresee the effects in advance is difficult and many research workers have hitherto synthesized a large number of sensitizing dyes and very intensely examined the photographic capabilities of the dyes. As the sensitizing dye, those having a partial structure comprising a nitrogen-containing heterocyclic ring having a sulfoalkyl group are very often used. The sulfoalkyl group well known includes a 2-sulfoethyl group, a 3-sulfopropyl group, a 4-sulfobutyl group and a 3-sulfobutyl group. With respect to the sulfoalkenyl group, only two groups are known in British Patent 1,077,611. However, sulfoalkenyl groups other than these have not yet been investigated and accordingly, their photographic capabilities cannot be anticipated at all at present.

The quaternary salt compound as a starting material of the methine compound of the present invention has hitherto been thoroughly not known and its photographic capabilities cannot be anticipated at all at present.

SUMMARY OF THE INVENTION

An object of the present invention is to provide a novel sultone, a novel quaternary salt compound and a novel methine compound.

Another object of the present invention is to provide a process for producing the above-described compounds.

Still another object of the present invention is to provide a silver halide photographic light-sensitive material comprising a novel quaternary salt compound and a novel methine compound, which is highly sensitive, reduced in the fog and excellent in the storage stability.

As a result of extensive investigations, it is found that the objects of the present invention can be attained by sultones represented by the following formulae (I) and (I'), quaternary salt compounds represented by the following formulae (II) and (II') and methine compounds represented by the following formulae (III) and (III'):

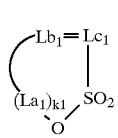

(I)

wherein $La_1$ represents a methylene group, $Lb_1$ nd $Lc_1$ each represents a methine group, and $k_1$ represents 2 or 3, provided that when $k_1$ is 2, $Lb_1$ and $Lc_1$ each is an unsubstituted methine group;

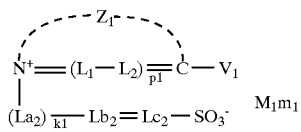

(II)

wherein $La_2$ represents a methylene group, $Lb_2$ and $Lc_2$ each represents a methine group, $k_1$ represents 2 or 3, $L_1$ and $L_2$ each represents a methine group, $V_1$ represents a hydrogen atom or a monovalent substituent, $Z_1$ represents an atomic group necessary for forming a 5- or 6-membered nitrogen-containing heterocyclic ring, $p_1$ represents 0 or 1, $M_1$ represents a counter ion for balancing the electric charge, and $m_1$ represents a number of from 0 to 10 necessary for neutralizing the molecular charge;

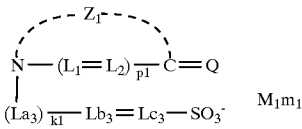  (III)

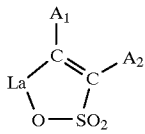 $M_1 m_1$ wherein $La_3$ represents a methylene group, $Lb_3$ and $Lc_3$ each represents a methine group, $k_1$ represents 2 or 3, $L_1$ and $L_2$ have the same meaning as in formula (II), Q represents a methine group or polymethyl group necessary for forming a methine dye, $Z_1$, $M_1$ and $m_1$ have the same meanings as in formula (II), and $p_1$ represents 0 or 1;

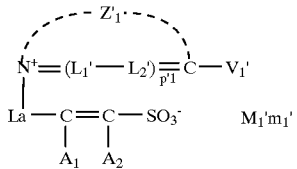  (I')

wherein $A_1$ and $A_2$ each represents a hydrogen atom, an alkyl group, an aryl group or a heterocyclic group, provided that $A_1$ and $A_2$ are not a hydrogen atom at the same time, and La represents a methylene group;

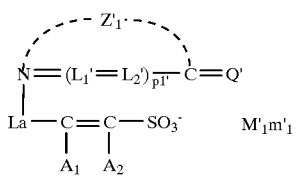 (II')

wherein $L_1'$ and $L_2'$ each represents a methine group, $V_1'$ represents a hydrogen atom or a monovalent substituent, $Z_1'$ represents an atomic group necessary for forming a 5- or 6-membered nitrogen-containing heterocyclic ring, $p_1'$ represents 0 or 1, $M_1'$ represents a counter ion for balancing the electric charge, $m_1'$ represents a number of from 0 to 10 necessary for neutralizing the molecular charge, and $A_1$, $A_2$ and La have the same meanings as defined in formula (I);

(III')

wherein Q' represents a methine group or polymethine group necessary for forming a methine dye, $A_1$, $A_2$, La, $L_1'$, $L_2'$, $Z_1'$, $p_1'$, $M_1'$ and $m_1'$ have the same meanings as defined in formula (II).

Further, a process for producing a sultone represented by formula (I) using a compound represented by the following formula (A) as a starting material, a process for producing a quaternary salt compound represented by formula (II) using a sultone represented by formula (I) as a starting material and a process for producing a methine compound represented by formula (III) using a quaternary salt compound represented by formula (II) have been found:

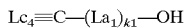 (A)

wherein $La_4$ represents a methylene group, $LC_4$ represents a methine group and $k_1$ represents 2 or 3.

Furthermore, the objects of the present invention can be attained by a silver halide photographic light-sensitive material comprising a quaternary salt compound represented by formula (II) and/or a methine compound represented by formula (III).

Further, a process for producing a quaternary salt compound represented by formula (II') using a sultone represented by formula (I') as a starting material and a process for producing a methine compound represented by formula (III') using a quaternary salt compound represented by formula (II') have been found.

Furthermore, the objects of the present invention can be attained by a silver halide photographic light-sensitive material comprising a quaternary salt compound represented by formula (II') and/or a methine compound represented by formula (III').

DETAILED DESCRIPTION OF THE INVENTION

The compounds for use in the present invention are described in detail below.

Examples of the 5- or 6-membered nitrogen-containing heterocyclic ring represented by Z or Z' in formulae (II), (II'), (III) and (III') include a thiazoline nucleus, a thiazole nucleus, a benzothiazole nucleus, an oxazoline nucleus, an oxazole nucleus, a benzoxazole nucleus, a selenazoline nucleus, a selenazole nucleus, a benzoselenazole nucleus, a 3,3-dialkylindolenine nucleus (e.g., 3,3-dimethylindolenine), an imidazoline nucleus, an imidazole nucleus, a benzimidazole nucleus, a 2-pyridine nucleus, a 4-pyridine nucleus, a 2-quinoline nucleus, a 4-quinoline nucleus, a 1-isoquinolidine nucleus, a 3-isoquinoline nucleus, an imidazo[4,5-b]quinoxaline nucleus, an oxadiazole nucleus, a thiadiazole nucleus, a tetrazole nucleus and a pyrimidine nucleus.

Of these, preferred are a benzoxazole nucleus, a benzothiazole nucleus, a benzimidazole nucleus and a quinoline nucleus, more preferred are a benzoxazole nucleus and a benzothiazole nucleus, still more preferred is a benzoxazole nucleus.

$p_1$ and $p_1'$ each represents 0 or 1, preferably 1.

Assuming that the substituents on $Z_1$ and $Z_1'$ are V and V', respectively, the substituent represented by V or V' is not particularly restricted, however, examples thereof include a halogen atom (e.g., chlorine, bromine, iodine, fluorine), a mercapto group, a cyano group, a carboxyl group, a phosphoric acid group, a sulfo group, a hydroxy group, a carbamoyl group (the "carbamoyl group" as used hereinafter means a carbamoyl group which may have a substituent), for example, a carbamoyl group having from 1 to 10, preferably from 2 to 8, more preferably from 2 to 5, carbon atoms (e.g., methylcarbamoyl, ethylcarbamoyl, morpholinocarbonyl), a sulfamoyl group (which may be substituted), for example, a sulfamoyl having from 0 to 10, preferably from 2 to 8, more preferably from 2 to 5, carbon atoms (e.g., methylsulfamoyl, ethylsulfamoyl, piperidinosulfonyl), a nitro group, an alkoxy group (which may be substituted), for example, an alkoxy group having from 1 to 20, preferably from 1 to 10, more preferably from 1 to 8 carbon atoms (e.g., methoxy, ethoxy, 2-methoxyethoxy, 2-phenylethoxy), an aryloxy group (which may be substituted), for example, an aryloxy group having from 6 to 20, preferably from 6 to 12, more preferably from 6 to 10, carbon atoms (e.g., phenoxy, p-methylphenoxy, p-chlorophenoxy, naphthoxy), an acyl group (which may be substituted), for example, an acyl group having from 1 to 20, preferably from 2 to 10, more preferably from 2 to 8, carbon atoms (e.g., acetyl, benzoyl, trichloroacetyl), an acyloxy group (which may be substituted), for example, an acyloxy group having from 1 to 20, preferably from 2 to 12, more preferably from 2 to 8, carbon atoms (e.g., acetyloxy, benzoyloxy), an acylamino group (which may be substituted), for example, an acylamino group having from 1 to 20, preferably from 2 to 12, more preferably from 2 to 8, carbon atoms (e.g., acetylamino), a sulfonyl group (which may be substituted), for example, a sulfonyl group having from 1 to 20, preferably from 1 to 10, more preferably from 1 to 8, carbon atoms (e.g., methanesulfonyl, ethanesulfonyl, benzenesulfonyl), a sulfinyl group (which may be substituted), for example, a sulfinyl group having from 1 to 20, preferably from 1 to 10, more preferably from 1 to 8, carbon atoms (e.g., methanesulfinyl, benzenesulfinyl), a sulfonylamino group (which may be substituted), for example, a sulfonylamino group having from 1 to 20, preferably from 1 to 10, more preferably from 1 to 8, carbon atoms (e.g., methanesulfonylamino, ethanesulfonylamino, benzenesulfonylamino), an amino group, a substituted amino group (which may be substituted), for example, a substituted amino group having from 1 to 20, preferably from 1 to 12, more preferably from 1 to 8 carbon atoms (e.g., methylamino, dimethylamino, benzylamino, anilino, diphenylamino), an ammonium group (which may be substituted), for example, an ammonium group having from 0 to 15, preferably from 3 to 10, more preferably from 3 to 6, carbon atoms (e.g., trimethylammonium, triethylammonium), a hydrazino group (which may be substituted), for example, a hydrazino group having from 0 to 15, preferably from 1 to 10, more preferably from 1 to 6, carbon atoms (e.g., trimethylhydrazino), a ureido group (which may be substituted), for example, a ureido group having from 1 to 15, preferably from 1 to 10, more preferably from 1 to 6, carbon atoms (e.g., ureido, N,N-dimethylureido), an imido group (which may be substituted), for example, an imido group having from 1 to 15, preferably from 1 to 10, more preferably from 1 to 6, carbon atoms (e.g., succinimido), an alkylthio or arylthio group (which may be substituted), for example, an alkylthio or arylthio group having from 1 to 20, preferably from 1 to 12, more preferably from 1 to 8, carbon atoms (e.g., methylthio, ethylthio, carboxyethylthio, sulfobutylthio, phenylthio), an alkoxycarbonyl group (which may be substituted), for example, an alkoxycarbonyl group having from 2 to 20, preferably from 2 to 12, more preferably from 2 to 8, carbon atoms (e.g., methoxycarbonyl, ethoxycarbonyl, benzyloxycarbonyl), an aryloxycarbonyl group (which may be substituted), for example, an aryloxycarbonyl group having from 6 to 20, preferably from 6 to 12, more preferably from 6 to 8, carbon atoms (e.g., phenoxycarbonyl), an alkyl group (which may be substituted), for example, an unsubstituted alkyl group having from 1 to 18, preferably from 1 to 10, more preferably from 1 to 5, carbon atoms (e.g., methyl, ethyl, propyl, butyl), a substituted alkyl group having from 1 to 18, preferably from 1 to 10, more preferably from 1 to 5, carbon atoms (e.g., hydroxymethyl, trifluoromethyl, benzyl, carboxyethyl, ethoxycarbonylmethyl, acetylaminomethyl; provided that the substituted alkyl group includes an unsaturated hydrocarbon group having from 2 to 18, preferably from 3 to 10, more preferably from 3 to 5, carbon atoms (e.g., vinyl, ethynyl, 1-cyclohexenyl, benzylidine, benzylidene)), an aryl group (which may be substituted), for example, an unsubstituted aryl group having from 6 to 20, preferably from 6 to 15, more preferably from 6 to 10, carbon atoms (e.g., phenyl, naphthyl, p-carboxyphenyl, p-nitrophenyl, 3,5-dichlorophenyl, p-cyanophenyl, m-fluorophenyl, p-tolyl), and a heterocyclic group (which may be substituted), for example, a heterocyclic group, which may be substituted, having from 1 to 20, preferably from 2 to 10, more preferably from 4 to 6, carbon atoms (e.g., pyridyl, 5-methylpyridyl, thienyl, furyl, morpholino, tetrahydrofurfuryl). The substituent may also have a structure where a benzene ring, a naphthalene ring or an anthracene ring is condensed. The substituent may further be substituted by V or V'.

The substituent on $Z_1$ or $Z_1'$ is preferably the above-described alkyl group, aryl group, alkoxy group, halogen atom, acyl group cyano group sulfonyl group or benzene ring condensed group more preferably the alkyl group, aryl group, halogen atom, acyl group, sulfonyl group or benzene ring condensed group, still more preferably a methyl group, a phenyl group, a methoxy group, a chlorine atom, a bromine atom, an iodine atom or a benzene ring condensed group, most preferably a phenyl group, a chlorine atom, a bromine atom or an iodine atom.

$La_1$, $La_2$, $La_3$ and $La_4$ in formulae (I), (II), (III) and (A) each represents a methylene group (the "methylene group" as used in the present invention includes a methylene group which may be substituted) and examples thereof include an unsubstituted methylene group and a substituted methylene group (for example, a methylene group substituted by V, specifically, a methyl group-substituted methylene group, an ethyl group-substituted methylene group, a phenyl group-substituted methylene group, a hydroxy group-substituted methylene group, a halogen atom (e.g., chlorine, bromine)-substituted methylene group). $La_1$, $La_2$, $La_3$ and $La_4$ each is preferably an unsubstituted methylene group.

$Lb_1$, $Lb_2$, $Lb_3$, $Lc_1$, $Lc_2$, $Lc_3$ and $Lc_4$ each represents an unsubstituted or substituted methine group (including, for example, a methine group substituted by V, specifically, a methyl group-substituted methine group, an ethyl group-substituted methine group, a phenyl group-substituted methine group, a hydroxy group-substituted methine group, a halogen atom (e.g., chlorine, bromine)-substituted methine group), preferably an unsubstituted methine group, a methyl group-substituted methine group, a chlorine atom-substituted methine group or a bromine atom-substituted methine group, more preferably an unsubstituted methine group.

In formula (I), however, when $k_1$ is 2, $Lb_1$ and $Lb_2$ each is an unsubstituted methine group.

$k_1$ represents 2 or 3, preferably 3. When $k_1$ is 2 or 3, the methylene group ($La_1$, $La_2$, $La_3$, $La_4$) is repeated and the methylene groups need not be the same.

Specific examples of preferred substituents on the nitrogen atom in formula (II) or (III) are set forth below. Compounds 1) to 6) are preferred in the order with Compound 6) being most preferred.

1) 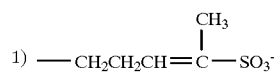

-continued

2) 
—CH$_2$CH$_2$CH=C—SO$_3^-$

3) —CH$_2$CH$_2$CH=CH—SO$_3^-$

4) 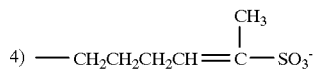
—CH$_2$CH$_2$CH$_2$CH=C(CH$_3$)—SO$_3^-$

5) —CH$_2$CH$_2$CH$_2$CH=C—SO$_3^-$

6) —CH$_2$CH$_2$CH$_2$CH=CH—SO$_3^-$

La in formulae (I'), (II') and (III') represents a methylene group (the "methylene group" as used in the present invention includes a methylene group which may be substituted) and examples thereof include an unsubstituted methylene group and a substituted methylene group (for example, a methylene group substituted by V, specifically, a methyl group-substituted methylene group, an ethyl group-substituted methylene group, a phenyl group-substituted methylene group, a hydroxy group-substituted methylene group, a halogen atom (e.g., chlorine, bromine)-substituted methylene group). La is preferably an unsubstituted methylene group.

A$_1$ and A$_2$ each represents a hydrogen atom or an alkyl, aryl or heterocyclic group described above with respect to V, provided that A$_1$ and A$_2$ are not a hydrogen atom simultaneously. A$_1$ and A$_2$ each is preferably a hydrogen atom, an alkyl group or an aryl group, more preferably a hydrogen atom or an unsubstituted alkyl group having from 1 to 4 carbon atoms (e.g., methyl, ethyl, propyl, butyl), still more preferably a hydrogen atom or a methyl group.

Preferred examples of formula (I) and preferred specific examples of the substituents on the nitrogen atoms in formulae (II) and (III) are set forth below. Between a) and b) in respective examples, a) is more preferred.

Preferred examples of formula (I):

a) 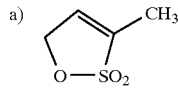

b) 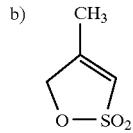

Preferred examples of the substituent at the N-position in formula (II) or (III):

a) 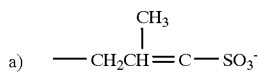
—CH$_2$CH=C(CH$_3$)—SO$_3^-$

-continued b) 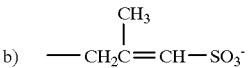
—CH$_2$C(CH$_3$)=CH—SO$_3^-$

Q and Q' each represents a methine group or polymethine group necessary for forming a methine dye. The number of methines in the polymethine group is preferably from 0 to 7, more preferably from 1 to 5, still more preferably from 1 to 3. When a methine group is integrated into the heterocyclic ring, the methine group seemingly becomes 0 in some cases. Examples thereof include simple merocyanine (zero merocyanine).

Q and Q' each may be any methine or polymethine group as long as it forms a methine dye, however, Q and Q' each is preferably a substituted methine group or polymethine group necessary for forming a methine dye. Examples of the substituent include an aromatic group, a heterocyclic group, an amino group, a cyano group, an alkoxycarbonyl group, an alkylsulfonyl group and an acyl group. More specifically, the aromatic group include substituted and unsubstituted aromatic groups (e.g., 4-dimethylaminophenyl, 4-methoxyphenyl, phenyl, 4-dimethylaminonaphthyl). The heterocyclic ring of the heterocyclic group include basic nuclei and acidic nuclei known for use in the formation of a dye and the heterocyclic rings formed by Z$_2$ to Z$_8$ which will be described layter. The amino group includes substituted and unsubstituted amino groups (e.g., amino, dimethylamino). The alkoxycarbonyl group includes substituted and unsubstituted alkoxycarbonyl groups (e.g., ethoxycarbonyl). The alkylsulfonyl group includes substituted and unsubstituted alkylsulfonyl groups (e.g., methanesulfonyl). The acyl group includes substituted and unsubstituted acyl groups (e.g., acetyl).

Any methine dye may be formed by Q or Q' but preferred are a cyanine dye, a merocyanine dye, a rhodacyanine dye, a trinuclear merocyanine dye, an allopolar dye, a hemicyanine dye and a styryl dye. These dyes are described in detail in F. M. Harmer, *Heterocyclic Compounds—Cyanine Dyes and Related Compounds*, John Wiley & Sons, New York, London (1964), and D. M. Sturmer, *Heterocyclic Compounds—Special Topics in Heterocyclic Chemistry*—, Chap. 18, Para. 14, pp. 482–515. The cyanine dye, the merocyanine dye and the rhodacyanine dye preferably have formulae (XI), (XII) and (XIII) described in U.S. Pat. No. 5,340,694, pp. 21–22, respectively.

In formula (III) or (III'), when a cyanine dye is formed by Q or Q', the compound can also be represented by the following resonance formula:

(III)

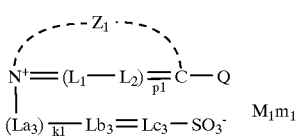

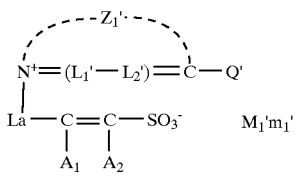
(III')

The methine group represented by $L_1$, $L_2$, $L_1'$ and $L_2'$ may have a substituent and examples of the substituent include the substituents described above with respect to V and V'. $L_1$, $L_2$, $L_1'$ and $L_2'$ is preferably an unsubstituted methine group.

$V_1$ and $V_1'$ each may be any as long as it is a monovalent substituent but $V_1$ and $V_1'$ each is preferably a substituent described above as V, more preferably a halogen atom (e.g., chlorine, bromine, iodine, fluorine), a mercapto group, a sulfo group, a hydroxy group, an alkoxy group having from 1 to 20, preferably from 1 to 6, more preferably 1, carbon atoms (e.g., methoxy, ethoxy, 2-methoxyethoxy, 2-phenylethoxy), an aryloxy group having from 6 to 20, preferably from 6 to 12, more preferably from 6 to 10, carbon atoms (e.g., phenoxy, p-methylphenoxy, p-chlorophenoxy, naphthoxy), a sulfonyl group having from 1 to 20, preferably from 1 to 10, more preferably from 1 to 8, carbon atoms (e.g., methanesulfonyl, ethanesulfonyl, benzenesulfonyl), an amino group, a hydrazino group having from 0 to 15, preferably from 1 to 10, more preferably from 1 to 6, carbon atoms (e.g., trimethylhydrazino), an alkylthio or arylthio group having from 1 to 20, preferably from 1 to 12, more preferably from 1 to 8, carbon atoms (e.g., methylthio, ethylthio, carboxyethylthio, sulfobutylthio, phenylthio), an unsubstituted alkyl group having from 1 to 18, preferably from 1 to 6, more preferably from 1 to 3, still more preferably 1, carbon atoms (e.g., methyl, ethyl, propyl, butyl), a substituted alkyl group having from 1 to 18, preferably from 1 to 10, more preferably from 1 to 5, carbon atoms (e.g., hydroxymethyl, trifluoromethyl, benzyl, carboxyethyl, ethoxycarbonylmethyl, acetylaminomethyl; provided that the substituted alkyl group includes an unsaturated hydrocarbon group having from 2 to 18, preferably from 3 to 10, more preferably from 3 to 5, carbon atoms (e.g., vinyl, ethynyl, 1-cyclohexenyl, benzylidine, benzylidene)), a substituted or unsubstituted aryl group having from 6 to 20, preferably from 6 to 15, more preferably from 6 to 10, carbon atoms (e.g., phenyl, naphthyl, p-carboxyphenyl, p-nitrophenyl, 3,5-dichlorophenyl, p-cyanophenyl, m-fluorophenyl, p-tolyl) or a heterocyclic group, which may be substituted, having from 1 to 20, preferably from 2 to 10, more preferably from 4 to 6, carbon atoms (e.g., pyridyl, 5-methylpyridyl, thienyl, furyl, morpholino, tetrahydrofurfuryl), still more preferably a methyl group.

$M_1$ and $M_1'$ are included in the formulae so as to show the presence of a cation or anion when necessary for neutralizing the ion charge of the dye. Typical examples of the cation include an inorganic cation such as hydrogen ion ($H^+$), alkali metal ion (e.g., sodium ion, potassium ion, lithium ion) and alkaline earth metal ion (e.g., calcium ion), and an organic ion such as ammonium ion (e.g., ammonium ion, tetraalkylammonium ion, pyridinium ion, ethylpyridinium ion). The anion may be either an inorganic anion or an organic anion, and examples thereof include a halogen anion (e.g., fluorine ion, chlorine ion, iodine ion), a substituted aryl sulfonate ion (e.g., p-toluene sulfonate ion, p-chlorobenzene sulfonate ion), an aryl disulfonate ion (e.g., 1,3-benzene sulfonate ion, 1,5-naphthalene disulfonate ion, 2,6-naphthalene disulfonate ion), an alkyl sulfate ion (e.g., methyl sulfate ion), a sulfate ion, a thiocyanate ion, a peracid chlorate ion, a tetrafluoroborate ion, a picrate ion, an acetate ion and a trifluoromethane sulfonate ion. An ionic polymer or other dye having reversed charge to the dye may also be used.

In the present invention, the sulfo group in formulae (II), (II'), (III) and (III') and in $R_1$ and $R_1'$ described below is shown as $SO_3^-$, however, it can be shown as $SO_3H$ when the counter ion present is a hydrogen ion.

$m_1$ and $m_1'$ each represents a number necessary for balancing the charge and when an inner salt is formed, $m_1$ and $m_1'$ each is 0.

The compound represented by formula (III) or (III') is more preferably a compound selected from those represented by the following formulae (IV), (V) and (VI):

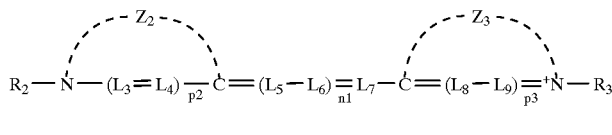
(IV)

wherein $L_3$, $L_4$, $L_5$, $L_6$, $L_7$, $L_8$ and $L_9$ each represents a methine group, $p_2$ and $p_3$ each represents 0 or 1, $n_1$ represents 0, 1, 2 or 3, $Z_2$ and $Z_3$ each represents an atomic group necessary for forming a 5- or 6-membered nitrogen-containing heterocyclic ring, $M_2$ represents a counter ion for balancing the electric charge, $m_2$ represents a number of from 0 to 4 necessary for neutralizing the molecular charge, and $R_2$ and $R_3$ each represents an alkyl group, provided that at least one of $R_2$ and $R_3$ is an alkyl group represented by $R_1$ or $R_1'$ shown below. For example, when $R_2$ is $R_1$ or $R_1'$, $Z_2$ is $Z_1$, or $Z_1'$, and when $R_2$ and $R_3$ both are $R_1$ or $R_1'$, $Z_2$ and $Z_3$ both are $Z_1$ or $Z_1'$.

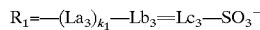

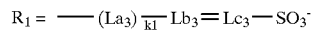

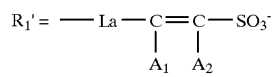

In $R_1$, $La_3$, $k_1$, $Lb_3$ and $LC_3$ have the same meanings as in formula (III).

In $R_1'$, La, $A_1$ and $A_2$ have the same meanings as in formula (III').

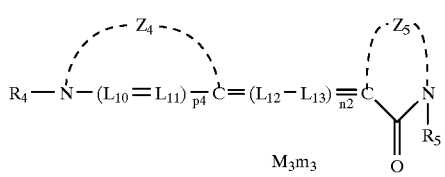

(V)

wherein $L_{10}$, $L_{11}$, $L_{12}$ and $L_{13}$ each represents a methine group, $p_4$ represents 0 or 1, $n_2$ represents 0, 1, 2 or 3, $Z_4$ and $Z_5$ each represents an atomic group necessary for forming a 5- or 6-membered nitrogen-containing heterocyclic ring, $M_3$ represents a counter ion for balancing the electric charge, $m_3$ represents a number of from 0 to 4 necessary for neutralizing the molecular charge, $R_4$ has the same meaning as $R_1$ or $R_1'$, and $R_5$ represents an alkyl group, an aryl group or a heterocyclic group.

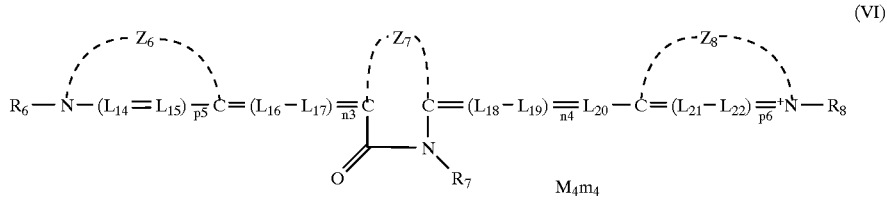

(VI)

wherein $L_{14}$, $L_{15}$, $L_{16}$, $L_{17}$, $L_{18}$, $L_{19}$, $L_{20}$, $L_{21}$ and $L_{22}$ each represents a methine group, $p_5$ and $p_6$ each represents 0 or 1, $n_3$ and $n_4$ each represents 0, 1, 2 or 3, $Z_6$, $Z_7$ and $Z_8$ each represents an atomic group necessary for forming a 5- or 6-membered nitrogen-containing heterocyclic ring, $M_4$ represents a counter ion for balancing the electric charge, $m_4$ represents a number of from 0 to 4 necessary for neutralizing the molecular charge, $R_6$ and $R_8$ each represents an alkyl group, $R_7$ represents an alkyl group, an aryl group or a heterocyclic group, provided that at least one of $R_6$ and $R_8$ is $R_1$ or $R_1'$.

Among formulae (IV), (V) and (VI), formula (IV) is preferred.

In formulae (IV), (V) and (V), $Z_2$, $Z_3$, $Z_4$, $Z_6$ and $Z_8$ each has the same meaning as $Z_1$ and their preferred embodiments are also the same.

$R_2$, $R_3$, $R_4$, $R_6$ and $R_8$ each represents an alkyl group. Examples thereof include an unsubstituted alkyl group having from 1 to 18, preferably from 1 to 7, more preferably from 1 to 4, carbon atoms (e.g., methyl, ethyl, propyl, isopropyl, butyl, isobutyl, hexyl, octyl, dodecyl, octadecyl) and a substituted alkyl group having from 1 to 18, preferably from 1 to 7, more preferably from 1 to 4, carbon atoms {examples of the substituent include the substituent V described above as the substituent of $Z_1$ or the like; the substituted alkyl group is preferably an aralkyl group (e.g., benzyl, 2-phenylethyl), an unsaturated hydrocarbon group (e.g., allyl), a hydroxyalkyl group (e.g., 2-hydroxyethyl, 3-hydroxypropyl), a carboxyalkyl group (e.g., 2-carboxyethyl, 3-carboxypropyl, 4-carboxybutyl, carboxymethyl), an alkoxyalkyl group (e.g., 2-methoxyethyl, 2-(2-methoxyethoxy)ethyl), an aryloxyalkyl group (e.g., 2-phenoxyethyl, 2-(1-naphthoxy)ethyl), an alkoxycarbonylalkyl group (e.g., ethoxycarbonylethyl, 2-benzyloxycarbonylethyl), an aryloxycarbonylalkyl group (e.g., 3-phenoxycarbonylpropyl), an acyloxyalkyl group (e.g., 2-acetyloxyethyl), an acylalkyl group (e.g., 2-acetylethyl), a carbamoylalkyl group (e.g., 2-morpholinocarbonylethyl), a sulfamoylalkyl group (e.g., N,N-dimethylsulfamoylmethyl), a sulfoalkyl group (e.g., 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl), a sulfoalkenyl group (e.g., sulfopropenyl, $R_1$ and $R_1'$ of the present invention), a sulfatoalkyl group (e.g., 2-sulfatoethyl, 3-sulfatopropyl, 4-sulfatobutyl), a heterocyclic ring-substituted alkyl group (e.g., 2-(pyrrolidin-2-on-1-yl)ethyl, tetrahydrofurfuryl) or an alkylsufonylcarbamoylmethyl group (e.g., methanesulfonylcarbamoylmethyl)}.

The alkyl group represented by $R_2$, $R_3$, $R_4$, $R_6$ or $R_8$ is preferably the above-described carboxyalkyl group, sulfoalkyl group, sulfoalkenyl group or unsubstituted alkyl group, more preferably the sulfoalkyl group or sulfoalkenyl group.

$Z_5$ represents an atomic group necessary for forming an acidic nucleus and may have the form of an acidic nucleus of any general merocyanine dyes. The acidic nucleus as used herein is defined in James (compiler), *The Theory of the Photographic Process*, 4th ed., page 198, Macmillan (1977), Specific examples thereof include those described in U.S. Pat. Nos. 3,567,719, 3,575,869, 3,804,634, 3,837,862, 4,002,480 and 4,925,777 and JP-A-3-167546 (the term "JP-A" as used herein means an "unexamined published Japanese patent application").

The acidic nucleus formed is preferably a 5- or 6-membered nitrogen-containing heterocyclic ring comprising carbon, nitrogen and chalcogen (typically, oxygen, sulfur, selenium and tellurium) atoms. Examples thereof include nuclei such as 2-pyrazolin-5-one, pyrazolidin-3,5-dione, imidazolin-5-one, hydantoin, 2-thiohydantoin, 4-thiohydantoin, 2-iminooxazolidin-4-one, 2-oxazolin-5-one, 2-thiooxazolin-2,4-dione, isooxazolin-5-one, 2-thiazolin-4-one, thiazolidin-4-one, thiazolidin-2,4-dione, rhodanine, thiazolidin-2,4-dithione, isorhodanine, indan-1, 3-dione, thiophen-3-one, thiophen-3-one-1,1-dioxide, indolin-2-one, indolin-3-one, 2-oxoindazolinium, 3-oxoindazolinium, 5,7-dioxo-6,7-dihydrothiazolo[3,2-a]pyrimidine, cyclohexane-1,3-dione, 3,4-dihydroisoquinolin-4-one, 1,3-dioxan-4,6-dione, barbituric acid, 2-thiobarbuturic acid, chroman-2,4-dione, indazolin-2-one, pyrido[1,2-a]pyrimidin-1,3-dione, pyrazolo[1,5-b]quinazolone, pyrazolo[1,5-a]benzimidazole, pyrazolopyridone, 1,2,3,4-tetrahydroquinolin-2,4-dione, 3-oxo-2,3-dihydrobenzo[d]thiophen-1,1-dioxide and 3-dicyanomethine-2,3-dihydrobenzo[d]thiophen-1,1-dioxide.

$Z_5$ is preferably hydantoin, 2-thiohydantoin, 4-thiohydantoin, 2-oxazolin-5-one, 2-thiooxazolin-2,4-dione, thiazolidin-2,4-dione, rhodanine, thiazolidin-2,4-dithione, barbituric acid or 2-thiobarbuturic acid, more preferably hydantoin, 2-thiohydantoin, 4-thiohydantoin, 2-oxazolin-5-one, rhodanine, barbituric acid or 2-thiobarbuturic acid, still more preferably 2-thiohydantoin, 4-thiohydantoin, 2-oxazolin-5-one or rhodanine.

The 5- or 6-membered nitrogen-containing heterocyclic ring formed by $Z_7$ is one resulting from removing the oxo group or thioxo group from the heterocyclic ring formed by $Z_5$, preferably one resulting from removing the oxo group or thioxo group from hydantoin, 2-thiohydantoin, 4-thiohydantoin, 2-oxazolin-5-one, 2-thiooxazolin-2,4-dione, thiazolidin-2,4-dione, rhodanine, thiazolidin-2,4-dithione, barbituric acid or 2-thiobarbuturic acid, more preferably one resulting from removing the oxo group or thioxo group from hydantoin, 2-thiohydantoin, 4-thiohydantoin, 2-oxazolin-5-one, rhodanine, barbituric acid or 2-thiobarbuturic acid, still more preferably one resulting from removing the oxo group or thioxo group from 2-thiohydantoin, 4-thiohydantoin, 2-oxazolin-5-one or rhodanine.

The alkyl group represented by $R_5$ or $R_7$ includes the unsubstituted alkyl group and the substituted alkyl group described above as the example of $R_2$, and $R_1$. The preferred embodiment thereof is also the same. Further, the alkyl group represented by $R_5$ or $R_7$ includes an unsubstituted aryl group having from 6 to 20, preferably from 6 to 10, more preferably from 6 to 8, carbon atoms (e.g., phenyl, 1-naphthyl), a substituted aryl group having from 6 to 20, preferably from 6 10, more preferably from 6 to 8, carbon atoms (for example, an aryl group substituted by V described above as the substituent of $Z_1$ or the like, specifically, p-methoxyphenyl, p-methylphenyl, p-chlorophenyl), an unsubstituted heterocyclic group having from 1 to 20, preferably from 3 to 10, more preferably from 4 to 8, carbon atoms (e.g., 2-furyl, 2-thienyl, 2-pyridyl, 3-pyrazolyl, 3-isooxazolyl, 3-isothiazolyl, 2-imidazolyl, 2-oxazolyl, 2-thiazolyl, 2-pyridazyl, 2-pyrimidyl, 3-pyrazyl, 2-(1,3,5-triazolyl), 3-(1,2,4-triazolylI, 5-tetrazolyl) and a substituted heterocyclic group having from 1 to 20, preferably from 3 to 10, more preferably from 4 to 8, carbon atoms (for example, a heterocyclic group substituted by V described above as the substituent of $Z_1$ or the like, specifically, 5-methyl-2-thienyl, 4-methoxy-2-pyridyl).

$R_5$ and $R_7$ each is preferably methyl, ethyl, 2-sulfoethyl, 3-sulfopropyl, 3-sulfobutyl, 4-sulfobutyl, carboxymethyl, phenyl, 2-pyridyl or 2-thiazolyl, more preferably ethyl, 2-sulfoethyl, carboxymethyl, phenyl or 2-pyridyl.

$L_3, L_4, L_5, L_6, L_7, L_8, L_9, L_{10}, L_{11}, L_{12}, L_{13}, L_{14}, L_{15}, L_{16}, L_{17}, L_{18}, L_{19}, L_{20}, L_{21}$ and $L_{22}$ each independently represents a methine group. The methine group represented by $L_3, L_4, L_5, L_6, L_7, L_8, L_9, L_{10}, L_{11}, L_{12}, L_{13}, L_{14}, L_{15}, L_{16}, L_{17}, L_{18}, L_{19}, L_{20}, L_{21}$ or $L_{22}$ may have a substituent and examples of the substituent include a substituted or unsubstituted alkyl group having from 1 to 15, preferably from 1 to 10, more preferably from 1 to 5, carbon atoms (e.g., methyl, ethyl, 2-carboxyethyl), a substituted or unsubstituted aryl group having from 6 to 20, preferably from 6 to 15, more preferably from 6 to 10, carbon atoms (e.g., phenyl, o-carboxyphenyl), a substituted or unsubstituted heterocyclic group having from 3 to 20, preferably from 4 to 15, more preferably from 6 to 10, carbon atoms (e.g., N,N-diethylbarbituric acid group), a halogen atom (e.g., chlorine, bromine, fluorine, iodine), an alkoxy group having from 1 to 15, preferably from 1 to 10, more preferably from 1 to 5, carbon atoms (e.g., methoxy, ethoxy), an alkylthio group having from 1 to 15, preferably from 1 to 10, more preferably from 1 to 5, carbon atoms (e.g., methylthio, ethylthio), an arylthio group having from 6 to 20, preferably from 6 to 15, more preferably from 6 to 10, carbon atoms (e.g., phenylthio) and an amino group having from 0 to 15, preferably from 2 to 10, more preferably from 4 to 10, carbon atoms (e.g., N,N-diphenylamino, N-methyl-N-phenylamino, N-methylpiperazino). The methine group may form a ring together with other methine group or form a ring together with $Z_1, Z_2, Z_3, Z_4, Z_6$ or $Z_8$.

$n_1$, $n_2$ and $n_3$ each is preferably 0, 1 or 2, more preferably 0 or 1, still more preferably 1. $n_4$ is preferably 0 or 1, more preferably 0. When $n_1$, $n_2$, $n_3$ and $n_4$ each is 2 or greater, the methine group is repeated but the methine groups need not be the same but may be different.

$M_2$, $M_3$, $M_4$, $m_2$, $m_3$ and $m_4$ have the same meanings as $M_1$ and $m_1$ in formula (III) and their preferred embodiment is also the same.

$p_2$, $p_3$, $p_4$, $p_5$ and $p_6$ each independently represents 0 or 1, preferably 0.

Specific examples of the compounds represented by formulae (I), (II) and (III) (including formulae (IV), (V) and (VI) as subordinate concepts) of the present invention and specific examples of the compound represented by formula (A) as a starting material are set forth below, however, the present invention is by no means limited thereto.

(I-1)

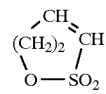

(I-2)

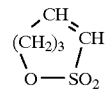

(I-3)

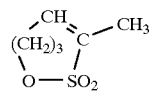

-continued
(I-4)
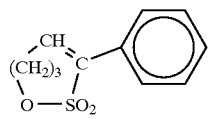
(I-5)
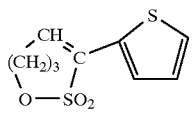
(I-6)
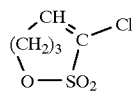
(I-7)
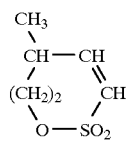
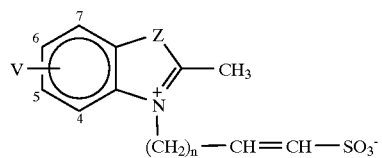
| No. | Z | V | n |
|---|---|---|---|
| (II-1) | O | H | 2 |
| (II-2) | " | " | 3 |
| (II-3) | S | " | 2 |
| (II-4) | " | " | 3 |
| (II-5) | $C(CH_3)_2$ | " | 2 |
| (II-6) | " | " | 3 |
| (II-7) | Se | " | 3 |
| (II-8) | Te | " | 3 |
| (II-9) | O | 5-phenyl | 3 |
| (II-10) | " | 5,6-benzo | 2 |
| (II-11) | " | " | 3 |
| (II-12) | " | 5-Br | 2 |
| (II-13) | " | " | 3 |
| (II-14) | " | 5-I | 2 |
| (II-15) | " | " | 3 |
| (II-16) | S | 5-Cl | 2 |
| (II-17) | " | " | 3 |
| (II-18) | N—$CH_3$ | 5,6-$Cl_2$ | 2 |
| (II-19) | " | " | 3 |

-continued
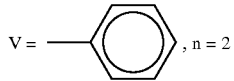
| No. | Z | V | n |
|---|---|---|---|
| (II-20) | O | 5-Br | 2 |
| (II-21) | " | " | 3 |
| (II-22) | S | 5-Cl | 2 |
| (II-23) | " | " | 3 |
| (II-24) | N—CH₃ | 5-CF₃-6-Cl | 2 |
| (II-25) | " | " | 3 |
| (II-26) | Se | 5-Cl | 2 |
| (II-27) | " | " | 3 |
| (II-28) | | | |
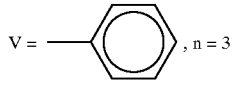
(II-29)
| (III-1) | V=Cl, n = 2 |
| (III-2) | V=Cl, n = 3 |
| (III-3) | V = —C₆H₅, n = 2 |
| (III-4) | V = —C₆H₅, n = 3 |
| (III-5) | n = 2 |
| (III-6) | n = 3 |

-continued
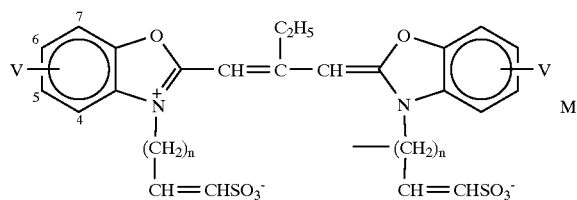
| No | V | n | M |
|---|---|---|---|
| (III-7) | 5-Br | 2 | Na⁺ |
| (III-8) | " | 3 | " |
| (III-9) | 5-I | 2 | $C_2H_5-N^+\text{-pyridinium}$ |
| (III-10) | " | 3 | " |
| (III-11) | 5,6-benzo | 2 | " |
| (III-12) | " | 3 | " |
| (III-13) | 5-Cl | 2 | Na⁺ |
| (III-14) | " | 3 | " |
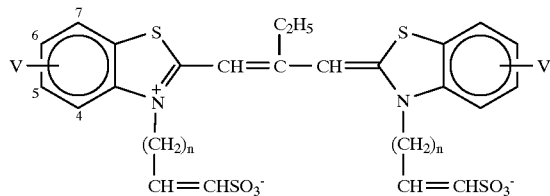
| No. | V | n | M |
|---|---|---|---|
| (III-15) | 5-Cl | 2 | Na⁺ |
| (III-16) | " | 3 | " |
| (III-17) | 4,5-benzo | 2 | $HN^+(C_2H_5)_3$ |
| (III-18) | 5-$CH_3$ | 3 | " |
(III-19)
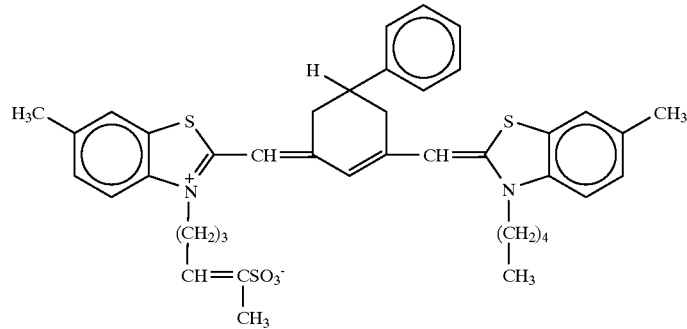

(III-20)
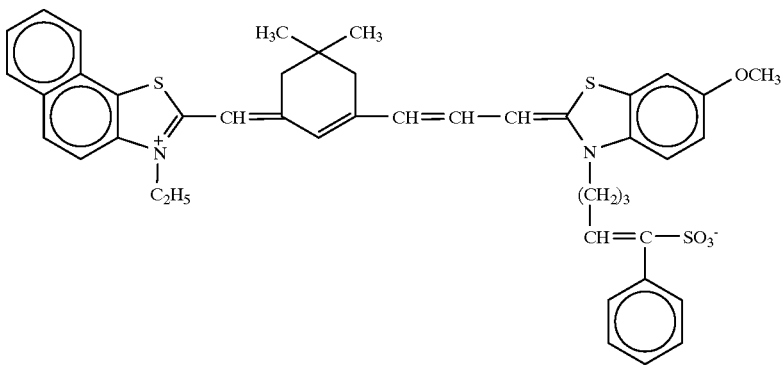
(III-21)
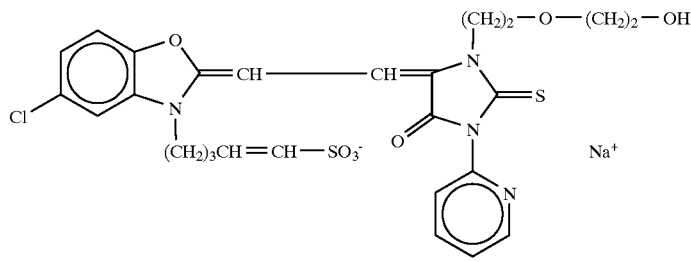
(III-22)
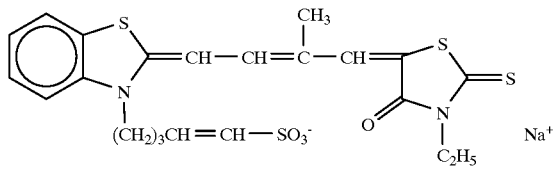
(III-23)
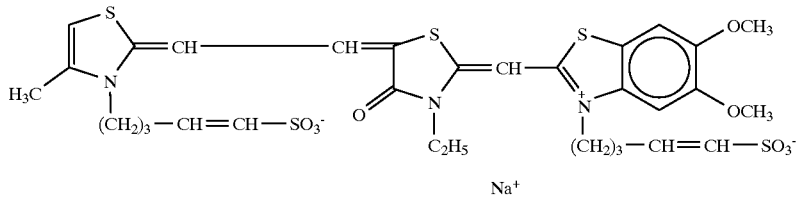
(III-24)
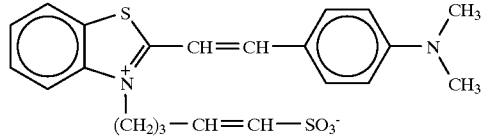
Specific examples of the compound represented by formula (A):
HC≡C—(CH₂)₂—OH (A-1)
HC≡C—(CH₂)—OH (A-2)
H₃C—C≡(CH₂)₃—OH (A-3)
HC≡C—(CH₂)₂—OH (A-1)

$$HC\equiv C-(CH_2)_3-OH \quad (A\text{-}2)$$

$$H_3C-C\equiv C-(CH_2)_3-OH \quad (A\text{-}3)$$

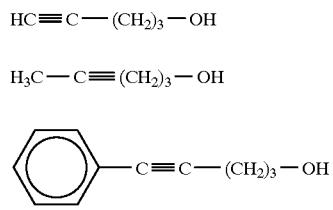

(A-4)

The compound represented by formula (I) of the present invention can be synthesized by referring to S. Patai and Z. Rappoport (compilers), *The Chemistry of SulPhonic Acids, Esters and their Derivatives,* John Wiley & Sons, New York, London (1991).

The compounds represented by formulae (II) and (III) (formula (II) including formulae (IV), (V) and (IV) as subordinate concepts) of the present invention can be synthesized based on the methods described in F. M. Harmer, *Heterocyclic Compounds—Cyanine Dyes and Related Compounds,* John Wiley & Sons, New York, London (1964), D. M. Sturmer, *Heterocyclic Compounds —Special Topics in Heterocyclic Chemistry—,* Chap. 18, Para. 14, pp. 482–515, John Wiley & Sons, New York, London (1977), and *Rodd's Chemistry of Carbon Compounds,* 2nd. Ed., Vol. IV, Part B, Chap. 15, pp. 369–422, Elsevier Science Publishing Company Inc., New York (1977).

The reaction conditions in synthesizing the compound represented by formula (I) from the compound represented by formula (A) are described in detail below. The reaction is performed such that $K_2S_2O_5$ or $NaHSO_3$ is added to Compound (A), $SO_3$ radicals are generated by an oxidizing agent (for example, an inorganic or organic oxidizing agent or air) to add to Compound (A) and ring closure is effected due to heat or the like. The reaction temperature may be selected from the range of from –100 to 270° C. but it is preferably from 0 to 100° C., more preferably from 25 to 70° C. The reaction solvent used may be any one including water, a polar solvent such as N,N-dimethylformamide (DMF), dimethyl sulfoxide (DMSO), sulforane and methanol, and a non-polar solvent such as hexane and xylene, but water is preferred. The feeding ratio $((A)/SO_3)$ of the starting materials may be selected from the range of from 0.5 to 20, but is preferably from 0.75 to 7, more preferably from 1 to 1.25.

The reaction condition in synthesizing the compound represented by formula (II) from the compound represented by formula (I) are described in detail below. The reaction is performed using an azole (nitrogen-containing heterocyclic ring) and Compound (I). The reaction temperature may be selected from the range of from 0 to 270° C. but it is preferably from 80 to 230° C., more preferably from 100 to 200° C. The reaction solvent used may be any one including a polar solvent such as N,N-dimethylformamide (DMF), dimethyl sulfoxide (DMSO) and sulforane, and a non-polar solvent such as anisole and xylene, exclusive of those which are subject to alkylation due to sultone (I) or decompose sultone (I). The solvent may not be used. The feeding ratio of the starting materials ((I)/an azole) may be selected from the range of from 0.5 to 20 but the ratio is preferably from 0.75 to 7, more preferably from 1 to 4. In the reaction, an acid or a base may or may not be used as a catalyst.

The compound represented by formula (III) may be synthesized by performing a reaction using the compound represented by formula (II) in combination with other material according to the structure of the objective compound.

The material used in combination may be selected generally by referring to the methods described in F. M. Harmer, *Heterocyclic Compounds—Cyanine Dyes and Related Compounds,* John Wiley & Sons, New York, London (1964), D. M. Sturmer, *Heterocyclic Compounds—Special Topics in Heterocyclic Chemistry—,* Chap. 18, Para. 14, pp. 482–515, John Wiley & Sons, New York, London (1977), and *Rodd's Chemistry of Carbon Compounds,* 2nd. Ed., Vol. IV, Part B, Chap. 15, pp. 369–422, Elsevier Science Publishing Company Inc., New York (1977).

The reaction conditions are described in detail below. The reaction temperature may be selected from the range of from –20 to 200° C. but it is preferably from 0 to 180° C., more preferably from 15 to 160° C. The reaction solvent may be selected from any range including water, a polar solvent such as N,N-dimethylformamide (DMF) and dimethylsulfoxide (DMSO), and a non-polar solvent such as benzene and hexane. A polar solvent such as DMF and DMSO, an alcohol such as methanol and ethanol, a nitrile such as acetonitrile and benzonitrile, an ester such as ethyl acetate, and an ether such as tetrahydrofuran and 1,2-dimethoxyethane are preferred and in particular, a polar solvent, an alcohol and a nitrile are more preferred. A mixed solvent thereof may also be used. An acid or a base may be used in the reaction. Both an acid and a base are preferably used as an admixture in some cases. The acid may be selected from an inorganic acid and an organic acid and an organic acid is preferred. In particular, a carboxylic acid such as acetic acid and propionic acid, and a phenol such as phenol and m-cresol are preferred. The base may be selected from an inorganic base and an organic base and an organic base is preferred. In particular, a tertiary amine such as triethylamine, and an aromatic heterocyclic amine such as pyridine are preferred.

Specific examples of the compounds represented by formulae (I'), (II') and (III') (including formulae (IV), (V) and (VI) as subordinate concepts) of the present invention are set forth below, however, the present invention is by no means limited thereto.

Specific examples of the compound represented by formula (I):

(I'-1)

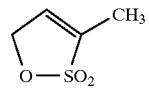

(I'-2)

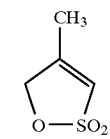

(I'-3)

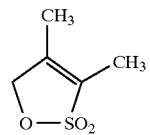

(I'-4) 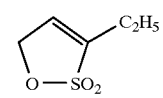
(I'-5) 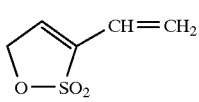
(I'-6) 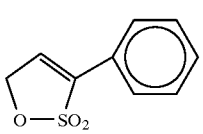
(I'-7) 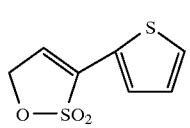
(I'-8) 
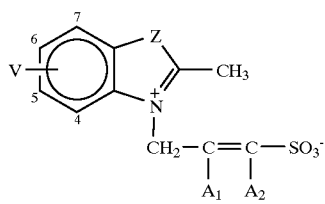
| No. | Z | V | $A_1$ | $A_2$ |
|---|---|---|---|---|
| (II'-1) | O | H | H | Me |
| (II'-2) | " | 5-Br | " | " |
| (II'-3) | " | 5-I | Me | H |
| (II'-4) | " | 5,6-benzo | H | Me |
| (II'-5) | S | 5-Cl | " | " |
| (II'-6) | " | " | Me | H |
| (II'-7) | " | 5-Me | " | " |
| (II'-8) | " | 5-⌬ | H | Me |
| (II'-9) | " | 4,5-benzo | " | " |
| (II'-10) | Se | 5,6-Me | " | " |
| (II'-11) | N—$C_2H_5$ | 5,6-$Cl_2$ | " | " |
| (II'-12) | " | 5-$CF_3$ | " | " |
| (II'-13) | $C(Me)_2$ | H | Me | H |
| (II'-14) | S | 5-Cl | " | Me |
| (II'-15) | Te | H | " | " |
(II'-16)
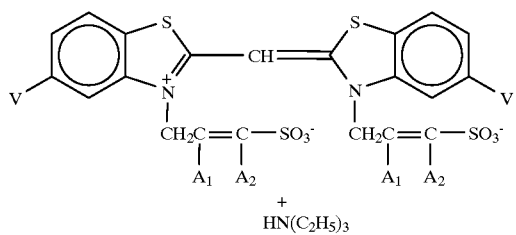
(II'-17)
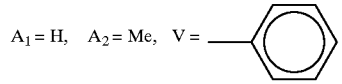
Specific examples of the compound represented by formula (III'):
(III'-1)
$A_1 = H$, $A_2 = Me$, $V = $ ⌬

-continued
(III'-2) $A_1 = Me$, $A_2 = H$, $V =$ 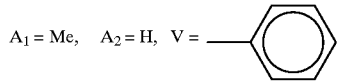
(III'-3)  $A_1$=Me, $A_2$=H, V=Cl
(III'-4)  $A_1$=H, $A_2$=Me, V=Cl
(III'-5)  $A_1$=$A_2$=Me, V=Cl
(III'-6)
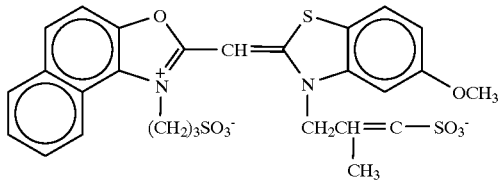
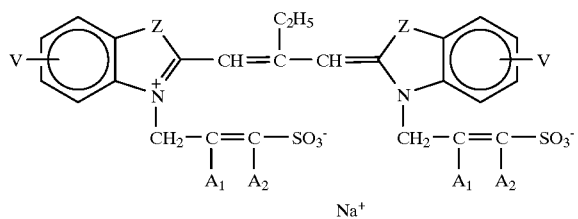
| No. | Z | V | $A_1$ | $A_2$ |
|---|---|---|---|---|
| (III'-7) | O | 5-Br | H | Me |
| (III'-8) | " | 5-I | Me | H |
| (III'-9) | " | 5,6-benzo | H | Me |
| (III'-10) | S | 5-Cl | " | " |
| (III'-11) | " | " | Me | H |
| (III'-12) | " | 5-Me | H | Me |
| (III'-13) | Se | 5-Cl | " | " |
| (III'-14) | N—$C_2H_5$ | 5,6-$Cl_2$ | " | " |
| (III'-15) | " | 5-CN-6-Cl | " | " |
| (III'-16) | Te | 5-Me | " | " |
(III'-17)
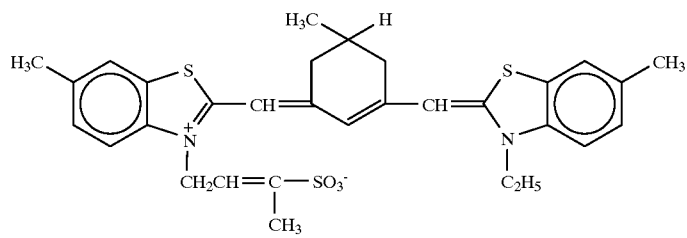
(III'-18)
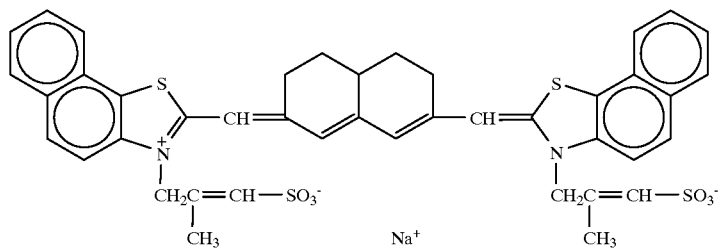

(III'-19)
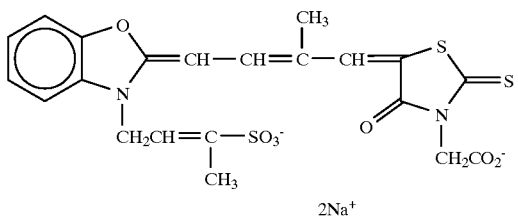
(III'-20)
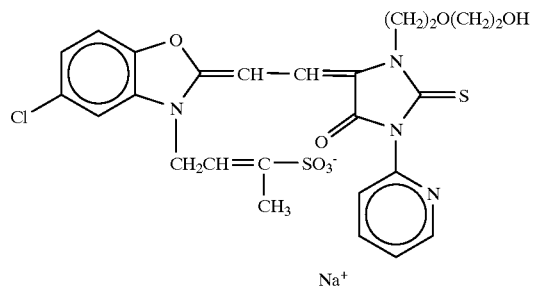
(III'-21)
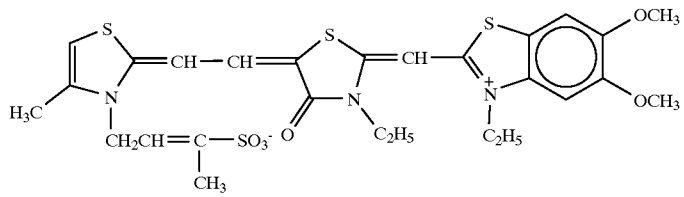
(III'-22)
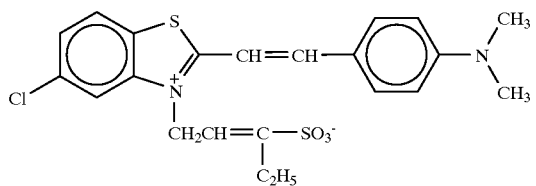
(III'-23)
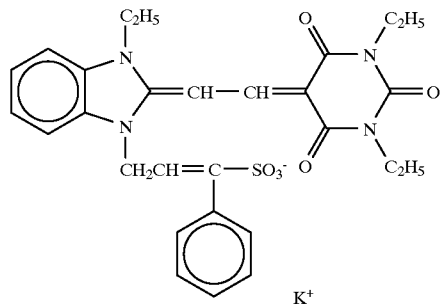
The compound represented by formula (I') of the present invention can be synthesized by referring to S. Patai and Z. Rappoport (compilers), *The Chemistry of Sulphonic Acids, Esters and their Derivatives,* John Wiley & Sons, New York, London (1991).

The compounds represented by formulae (II') and (III') (formula (II') including formulae (IV), (V) and (IV) as subordinate concepts) of the present invention can be synthesized based on the methods described in F. M. Harmer, *Heterocyclic Compounds—Cyanine Dyes and Related Compounds,* John Wiley & Sons, New York, London (1964), D. M. Sturmer, *Heterocyclic Compounds—Special Topics in Heterocyclic Chemistry—,* Chap. 18, Para. 14, pp. 482–515, John Wiley & Sons, New York, London (1977), and *Rodd's Chemistry of Carbon Compounds,* 2nd. Ed., Vol. IV, Part B, Chap. 15, pp. 369–422, Elsevier Science Publishing Company Inc., New York (1977).

The reaction conditions in synthesizing the compound represented by formula (II') from the compound represented by formula (I') are described in detail below. The reaction is performed using an azole (nitrogen-containing heterocyclic ring) and Compound (I'). The reaction temperature may be selected from the range of from 0 to 270° C. but it is preferably from 80 to 230° C., more preferably from 100 to 200° C. The reaction solvent used may be any one including a polar solvent such as N,N-dimethylformamide (DMF), dimethyl sulfoxide (DMSO) and sulforane, and a non-polar solvent such as anisole and xylene, exclusive of those which are subject to alkylation due to sultone (I') or decompose sultone (I'). The solvent may not be used. The feeding ratio of the starting materials ((I')/an azole) may be selected from the range of from 0.5 to 20 but the ratio is preferably from 0.75 to 7, more preferably from 1 to 4. In the reaction, an acid or a base may or may not be used as a catalyst.

The compound represented by formula (III') may be synthesized by performing a reaction using the compound represented by formula (II') in combination with other material according to the structure of the objective compound. The material used in combination may be selected generally by referring to the methods described in F. M. Harmer, *Heterocyclic Compounds—Cyanine Dyes and Related Compounds,* John Wiley & Sons, New York, London (1964), D. M. Sturmer, *Heterocyclic Compounds—Special Topics in Heterocyclic Chemistry—,* Chap. 18, Para. 14, pp. 482–515, John Wiley & Sons, New York, London (1977), and *Rodd's Chemistry of Carbon Compounds,* 2nd. Ed., Vol. IV, Part B, Chap. 15, pp. 369–422, Elsevier Science Publishing Company Inc., New York (1977).

The reaction conditions are described in detail below. The reaction temperature may be selected from the range of from −20 to 200° C. but it is preferably from 0 to 180° C., more preferably from 15 to 160° C. The reaction solvent may be selected from any range including water, a polar solvent such as N,N-dimethylformamide (DMF) and dimethylsulfoxide (DMSO), and a non-polar solvent such as benzene and hexane. A polar solvent such as DMF and DMSO, an alcohol such as methanol and ethanol, a nitrile such as acetonitrile and benzonitrile, an ester such as ethyl acetate, and an ether such as tetrahydrofuran and 1,2-dimethoxyethane are preferred and-in particular, a polar solvent, an alcohol and a nitrile are more preferred. A mixed solvent thereof may also be used. An acid or a base may be used in the reaction. Both an acid and a base are preferably used as an admixture in some cases. The acid may be selected from an inorganic acid and an organic acid and an organic acid is preferred. In particular, a carboxylic acid such as acetic acid and propionic acid, and a phenol such as phenol and m-cresol are preferred. The base may be selected from an inorganic base and an organic base and an organic base is preferred. In particular, a tertiary amine such as triethylamine, and an aromatic heterocyclic amine such as pyridine are preferred.

The silver halide photographic light-sensitive material of the present invention is described in detail below.

The silver halide photographic light-sensitive material may use a methine compound represented by formula (III) or (III') and a quaternary salt compound represented by formula (II) or (II') of the present invention (hereinafter referred to as "a methine compound of the present invention" and "a quaternary salt compound of the present invention", respectively) individually or in combination with other sensitizing dye.

The methine compound and the quaternary salt compound of the present invention (the same goes for other sensitizing dye) each may be added to the silver halide emulsion of the present invention in any step hitherto known to be useful during the preparation of emulsion. For example, the compound may be added during grain formation of silver halide and/or before desalting, or during desalting and/or between after desalting and before initiation of chemical ripening as disclosed in U.S. Pat. Nos. 2,735,766, 3,628,960, 4,183,756 and 4,225,666, JP-A-58-184142 and JP-A-60-196749, or may be added at any time or step before coating of the emulsion such as immediately before or during chemical ripening or after chemical ripening but before coating as disclosed in JP-A-58-113920. Also, as disclosed in U.S. Pat. No. 4,225,666 and JP-A-58-7629, the same compound alone or in combination with a compound having a different structure may be added in parts, for example, a part during grain formation and the remaining during chemical ripening or after completion of the chemical ripening, or a part before or during chemical ripening and the remaining after completion of the chemical ripening, and the kind of the compounds added in parts or the combination of the compounds may be changed.

The addition amounts of the methine compound and the quaternary salt compound of the present invention vary depending on the shape or size of the silver halide grain but it may be from $1 \times 10^{-6}$ to $8 \times 10^{-3}$ mol per mol of silver halide. For example, in the case when the silver halide grain size is from 0.2 to 1.3 $\mu$m, the addition amount is preferably from $2 \times 10^{-6}$ to $3.5 \times 10^{-3}$ mol, more preferably from $7.5 \times 10^{-6}$ to $1.5 \times 10^{-3}$ mol, per mol of silver halide.

The methine compound and the quaternary salt compound of the present invention may be dispersed directly in the emulsion or may be added to the emulsion in the form of a solution after dissolving it in an appropriate solvent such as methyl alcohol, ethyl alcohol, methyl cellosolve, acetone, water, pyridine or a mixed solvent thereof. At this time, a base, an acid or additives such as a surface active agent may be present together. Further, an ultrasonic wave may be used in the dissolution. Furthermore, the methine compound may be added by a method such that the compound is dissolved in a volatile organic solvent, the solution is dispersed in a hydrophilic colloid and the dispersion is added to the emulsion as described in U.S. Pat. No. 3,469,987, a method such that the compound is dispersed in a water-soluble solvent and the dispersion is added to the emulsion as described in JP-B-46-24185 (the term "JP-B" as used herein means an "examined Japanese patent publication"), a method such that the methine compound is dissolved in a surface active agent and the solution is added to the emulsion as described in U.S. Pat. No. 3,822,135, a method such that the compound is dissolved using a compound capable of red shifting and the solution is added to the emulsion as described in JP-A-51-74624, or a method such that the methine compound is dissolved in an acid containing substantially no water and the solution is added to the emulsion as described in JP-A-50-80826. In addition, the compound may be added to the emulsion using the methods described in U.S. Pat. Nos. 2,912,343, 3,342,605, 2,996,287 and 3,429,835.

The methine compound of the present invention may also be used as a filter dye, an irradiation preventive dye or an antihalation dye for various purposes such as improvement of sharpness and color separation capability.

The methine compound can be incorporated into a coating solution for a silver halide photographic light-sensitive layer, a filter layer and/or an antihalation layer by a usual method. The use amount of the dye may be enough if it can color the photographic layer and one skilled in the art may easily select the amount appropriately depending upon the end use. In general, the dye is preferably used so that the optical density can fall within the range of from 0.05 to 3.0.

The dye may be added at any step before the coating.

A polymer having a reversed charge to the dye ion may be present together in the layer as a mordant so as to localize the dye in a specific layer by the interaction of the polymer with the dye molecule.

Examples of the polymer mordant include those described in U.S. Pat. Nos. 2,548,564, 4,124,386, 3,625,694, 3,958,995, 4,168,976 and 3,445,231.

Examples of the supersensitizer useful for the spectral sensitization in the present invention include pyrimidylamino compounds, triazinylamino compounds and azolium compounds described in U.S. Pat. Nos. 3,511,664, 3,615,613, 3,615,632, 3,615,641, 4,596,767, 4,945,038, 4,965,182 and 4,965,182, and with respect to the use method thereof, the methods described in these patents are also preferred.

The silver halide which can be used in the silver halide light-sensitive material of the present invention may be any of silver bromide, silver iodobromide, silver iodochlorobromide, silver chlorobromide and silver chloride. Preferred silver halides are silver bromide, silver chlorobromide, silver iodochlorobromide and high silver chloride described in JP-A-2-42.

The constitution and processing of the light-sensitive material are described below, however, the constitution and processing described in JP-A-2-42 are preferably used particularly in the case of high silver chloride.

The constitution and the processing described in JP-A-63-264743 are preferably used particularly in the case of silver chlorobromide.

The silver halide grain may comprise phases different between the inside and the surface layer or may comprise a homogeneous phase. A grain where a latent image is mainly formed on the surface (for example, a negative light-sensitive material), a grain where a latent image is mainly formed in the inside of the grain (for example, an internal latent image-type light-sensitive material) or a previously fogged grain (for example, a direct positive light-sensitive material) may be used.

The silver halide grains having various halogen compositions, crystal habits, grain inner structures, shapes or distributions described above, are used in the light-sensitive photographic materials (elements) for various use purposes.

The silver halide grain in the photographic light-sensitive material may have a regular crystal form such as cubic, tetradecahedral or rhombic decahedral form, an irregular crystal form such as spherical or tabular form, or a composite form of these crystal forms. A mixture of grains having various crystal forms may also be used.

In the photographic light-sensitive material of the present invention, the silver halide grain forming the emulsion layer preferably has an aspect ratio of from 3 to 100. The term "an aspect ratio of from 3 to 100" as used herein means that silver halide grains having an aspect ratio (circle-corresponding diameter of a silver halide grain/thickness of a grain) of from 3 to 100 account for 50% or more of the projected area of all silver halide grains in the emulsion. The aspect ratio is preferably from 3 to 20, most preferably from 4 to 12. The tabular grain can be easily prepared by the methods described in Gutoff, *Photographic Science and Engineering,* Vol. 14, pp. 248–257 (1970), U.S. Pat. Nos. 4,434,226, 4,414,310, 4,433,048 and 4,439,520 and British Patent 2,112,157.

In the photographic light-sensitive material of the present invention, the existence ratio of such a grain is 70% or more, preferably 85% or more.

The methine compound of the present invention is used in the light-sensitive materials for the uses described later, as a sensitizer, a sensitizing dye or a filter or for the purpose of antihalation or irradiation prevention. The dye may be added to a desired layer such as an interlayer, a protective layer or a back layer other than the light-sensitive emulsion layer.

The methine compound of the present invention may be used in various color or black-and-white silver halide photographic light-sensitive materials.

More specifically, the compound may be used in a color positive light-sensitive material, a light-sensitive material for color paper, a color-negative light-sensitive material, a color reversal light-sensitive material (may or may not contain a coupler), a direct positive silver halide photographic light-sensitive material, a photographic light-sensitive material for photomechanical process (for example, lith film, lith dupe film), a light-sensitive material for cathode-ray tube display, a light-sensitive material for X-ray recording (in particular, direct or indirect photographing material using a screen), a light-sensitive material for use in the silver salt diffusion transfer process, a light-sensitive material for use in the color diffusion transfer process, a light-sensitive material for use in the dye transfer process (inhibition process), a light-sensitive material for use in the silver dye bleaching process or a heat-developable light-sensitive material.

The silver halide photographic emulsion for use in the present invention may be prepared using the methods described in P. Glafkides, *Chemie et Phisique Photographilue,* Paul Montel (1967), G. F. Duffin, *Photographic Emulsion Chemistry,* The Focal Press (1966), and V. L. Zelikman et al., *Making and Coating Photographic Emulsion,* The Focal Press (1964).

At the formation of silver halide grains, a silver halide solvent such as ammonia, potassium thiocyanate, ammonium thiocyanate, a thioether compound (for example, those described in U.S. Pat. Nos. 3,271,157, 3,574,628, 3,704,130, 4,297,439 and 4,276,374), a thione compound (for example, those described in JP-A-53-144319, JP-A-53-82408 and JP-A-55-77737) and an amine compound (for example, those described in JP-A-54-100717), may be used so as to control the growth of grains.

In the process of formation or physical ripening of silver halide grains, a cadmium salt, a zinc salt, a thallium salt, an iridium salt or a complex salt thereof, a rhodium salt or a complex salt thereof, or an iron salt or an iron complex salt may be present together.

Examples of the internal latent image-type silver halide emulsion for use in the present invention include a conversion type silver halide emulsion, a core/shell type silver halide emulsion and a silver halide emulsion having incorporated therein a different kind of metal, described in U.S. Pat. Nos. 2,592,250, 3,206,313, 3,447,927, 3,761,276 and 3,935,014.

The silver halide emulsion is usually subjected to chemical sensitization. The chemical sensitization may be performed using the method described, for example, in H. Fieser (compiler), *Die Grundlagen der Photographischen Prozesse mit Silberhalogeniden*, Akademishe Verlagsgesellschaft, pp. 675–734 (1968).

More specifically, a sulfur sensitization method using a compound containing sulfur capable of reaction with active gelatin or silver (e.g., thiosulfates, thioureas, mercapto compounds, rhodanines); a selenium sensitization method; a reduction sensitization method using a reducing material (e.g., stannous salt, amines, hydrazine derivatives, formamidinesulfinic acid, silane compounds); and a noble metal sensitization method using a noble metal compound (e.g., gold complex salt, a complex salt of metals belonging to Group VIII of the Periodic Table, such as Pt, Ir and Pd) may be used individually or in combination.

The photographic light-sensitive material of the present invention may contain various compounds so as to prevent fogging or to stabilize photographic capabilities, during production, storage or photographic processing of the light-sensitive material. More specifically, a large number of compounds known as an antifoggant or a stabilizer may be added and examples thereof include azoles such as benzothiazolium salts described in U.S. Pat. Nos. 3,954,478 and 4,942,721 and JP-A-59-191032, an open ring form thereof described in JP-B-59-26731, nitroindazoles, triazoles, benzotriazoles and benzimidazoles (in particular, nitro- or halogen-substitution product); heterocyclic mercapto compounds such as mercaptothiazoles, mercaptobenzothiazoles, mercaptobenzimidazoles, mercaptothiadiazoles, mercaptotetrazoles (in particular, 1-phenyl-5-mercaptotetrazole) and mercaptopyrimidines; the above-described heterocyclic mercapto compounds having a water-soluble group such as a carboxyl group or a sulfone group; thioketone compounds such as oxazolinethione; azaindenes such as tetrazaindenes (in particular, 4-hydroxy-substituted (1,3,3a,7) tetrazaindenes); benzenethiosulfonic acids; benzenesulfinic acids; and acetylene compounds described in JP-A-62-87957.

The silver halide photographic light-sensitive material of the present invention may contain a color coupler such as a cyan coupler, a magenta coupler or a yellow coupler, or a compound capable of dispersing a coupler.

More specifically, the silver halide photographic light-sensitive material of the present invention may contain a compound capable of forming a color upon oxidation coupling with an aromatic primary amine developing agent (e.g., phenylenediamine derivative, aminophenol derivative). Examples of the magenta coupler include a 5-pyrazolone coupler, a pyrazolobenzimidazole coupler, a cyanoacetylcoumarone coupler and an open-chained acylacetonitrile coupler. Examples of the yellow coupler include an acylacetamide coupler (e.g., benzoylacetanilides, pivaloylacetanilides). Examples of the cyan coupler include a naphthol coupler and a phenol coupler. These couplers are preferably nondiffusible as having a hydrophobic group called a ballast group within the molecule. The coupler may be either 4-equivalent or 2-equivalent to the silver ion. Further, the coupler may be a colored coupler having a color correction effect or a coupler which releases a development inhibitor accompanying the development (so-called DIR coupler).

Other than the DIR coupler, a non-coloring DIR coupling compound which forms a colorless product upon coupling reaction and releases a development inhibitor, may also be incorporated.

The photographic light-sensitive material of the present invention may contain, for example, polyalkylene oxide or a derivative thereof such as ether, ester or amine, a thioether compound, a thiomorpholine, a quaternary ammonium salt compound, a urethane derivative, a urea derivative, an imidazole derivative or a 3-pyrazolidone, so as to increase the sensitivity, intensify the contrast or accelerate the development.

The silver halide light-sensitive material of the present invention may contain various dyes other than the methine compound of the present invention, as a filter dye or for other various purposes such as prevention of irradiation.

Examples of the dye include oxonol dyes having a pyrazolone nucleus or a barbituric acid nucleus described in British Patents 506,385, 1,177,429, 1,311,884, 1,338,799, 1,385,371, 1,467,214, 1,433,102 and 1,553,516, JP-A-48-85130, JP-A-49-114420, JP-A-52-117123, JP-A-55-161233, JP-A-59-111640, JP-B-39-22069, JP-A-43-13168, JP-A-62-273527, U.S. Pat. Nos. 3,247,127, 3,469,985 and 4,078,933, other oxonol dyes described in U.S. Pat. Nos. 2,533,472 and 3,379,533, British Patent 1,278,621, JP-A-1-134447 and JP-A-1-183652, azo dyes described in British Patents 575,691, 680,631, 599,623, 786,907, 907,125 and 1,045,609, U.S. Pat. No. 4,255,326, JP-B-59-211043, azomethine dyes described in JP-A-50-100116, JP-A-54-118247, British Patents 2,014,598 and 750,031, anthraquinone dyes described in U.S. Pat. No. 2,865,752, arylidene dyes described in U.S. Pat. Nos. 2,533,009, 2,688,541 and 2,538,008, British Patents 584,609 and 1,210,252, JP-A-50-40625, JP-A-51-3623, JP-A-51-10927, JP-A-54-118247, JP-B-48-3286 and JP-B-59-37303, styryl dyes described in JP-B-28-3082, JP-B-44-16594 and JP-B-59-28898, triarylmethane dyes described in British Patents 446,583 and 1,335,422, and JP-A- 59-228250, merocyanine dyes described in British Patents 1,075,653, 1,153,341, 1,284,730, 1,475,228 and 1,542,807, and cyanine dyes described in U.S. Pat. Nos. 2,843,486 and 3,294,539, and JP-A-1-291247.

These dyes are prevented from diffusion by the method described below.

A method of letting a hydrophilic polymer having a charge reverse to the anionic dye dissociated be present together as a mordant in the layer to localize the dye in a specific layer by the interaction with the dye molecule, is disclosed, for example, in U.S. Pat. Nos. 2,548,564, 4,124,386 and 3,625,694.

A method for dyeing a specific layer using a water-insoluble dye solid is disclosed in JP-A-56-12639, JP-A-55-155350, JP-A-55-155351, JP-A-63-27838, JP-A-63-197943 and European Patent 15,601.

Further, a method for dyeing a specific layer using a metal salt fine particle to which a dye is adsorbed is disclosed in U.S. Pat. Nos. 2,719,088, 2,496,841 and 2,496,843, and JP-A-60-45237.

The photographic light-sensitive material of the present invention may contain various surface active agents as a coating agent or for various purposes such as prevention of electrostatic charge, improvement of slipperiness, emulsion dispersion, prevention of adhesion and improvement of photographic properties (for example, acceleration of development, intensification of contrast, sensitization).

In practicing the present invention, other additives are used together with a silver halide emulsion or other hydrophilic colloid, and examples thereof include a discoloration inhibitor, an inorganic or organic hardening agent, a color fogging inhibitor, an ultraviolet absorbent, a mordant, a plasticizer, a latex polymer and a matting agent. These additives are specifically described in *Research Disclosure*, Vol. 176 (1978, XI), D-17643.

The photographic light-sensitive material of the present invention uses a hydrophilic polymer such as gelatin, as a protective colloid.

The finished silver halide emulsion or the like is coated on an appropriate support such as baryta paper, resin-coated paper, synthetic paper, triacetate film, polyethylene terephthalate film, other plastic base or glass plate.

The exposure for obtaining a photographic image may be performed using a usual method. More specifically, any of various known light sources such as natural light (sun light), tungsten lamp, fluorescent lamp, mercury lamp, xenon arc lamp, carbon arc lamp, xenon flash lamp and cathode-ray tube flying spot, may be used. With respect to the exposure time, the exposure time of from $1/1,000$ sec to 1 sec used in a usual camera may of course be used, and also the exposure shorter than $1/1,000$ sec, for example, the exposure of from $1/10^4$ to $1/10^6$ sec, using a xenon flash lamp or cathode-ray tube may be used, or the exposure longer then 1 sec may be used. If desired, the spectral composition of the light used in the exposure may be controlled by a color filter. A laser light may also be used for the exposure. Further, the exposure may be performed by the light emitted from a phosphor excited by an electron beam, X ray, γ ray or α ray.

In the photographic processing of the light-sensitive material of the present sent invention, any of known methods and known processing solutions as described, for example, in *Research Disclosure*, No. 176, pp. 28–30 (RD-17643) may be used. The photographic processing may be either photographic processing of forming a silver image (black-and-white photographic processing) or photographic processing of forming a dye image (color photographic processing) depending on the purpose. The processing temperature is usually from 18 to 50° C., however, a temperature lower than 18° C. or exceeding 50° C. may also be used.

A silver halide photographic light-sensitive material having a magnetic recording layer, which may be used in the present invention, is prepared in such a manner that a polyester thin layer support previously subjected to heat treatment, as described in detail in JP-A-6-35118, JP-A-6-17528 and *JIII Journal of Technical Disclosure* No. 94-6023, such as a polyethylene aromatic dicarboxylate-base polyester support, having a thickness of from 50 to 300 μm, preferably from 50 to 200 μm, more preferably from 80 to 115 μm, still more preferably from 85 to 105 μm, is subjected to heat treatment (annealing) at a temperature of from 40° C. to a glass transition temperature for from 1 to 1,500 hours, the support is then subjected to surface treatment such as ultraviolet irradiation described in JP-B-43-2603, JP-B-43-2604 and JP-B-45-3828 or corona discharging described in JP-B-48-5043 and JP-A-51-131576, undercoating described in U.S. Pat. No. 5,326,689 is applied thereon, a subbing layer described in U.S. Pat. No. 2,761,791 is provided, if desired, and ferromagnetic particles described in JP-A-59-23505, JP-A-4-195726 and JP-A-6-59357 are coated thereon.

The above-described magnetic layer may be coated like a stripe as described in JP-A-4-124642 and JP-A-4-124645.

The support may further be subjected to antistatic treatment described in JP-A-4-62543. Finally, a silver halide emulsion is coated thereon. The silver halide emulsion used here include those described in JP-A-4-166932, JP-A-3-41436 and JP-A-3-41437.

Such a light-sensitive material is preferably manufactured according to the manufacture control method described in JP-B-4-86817 and the manufacturing data are preferably recorded thereon according to the method described in JP-B-6-87146. After or before the recording, the light-sensitive material is cut into a film smaller in the width than the conventional 135 size film and two perforations are punched at one side per one small-format picture in agreement with the small format picture reduced in the size than the conventional one, according to the method described in JP-A-4-125560.

The thus-prepared film is loaded before use in a cartridge package described in JP-A-4-157459, a cartridge described in JP-A-5-210202, FIG. 9, a film patrone described in U.S. Pat. No. 4,221,479 or a cartridge described in U.S. Pat. Nos. 4,834,306, 4,834,366, 5,226,613 and 4,846,418.

The film cartridge or film patrone used here is preferably of such a type that the tongue can be housed as described in U.S. Pat. Nos. 4,848,693 and 5,317,355 in view of the light-shielding property.

Further, a cartridge having a lock mechanism described in U.S. Pat. No. 5,296,886, a cartridge capable of indicating the use state described in U.S. Patent 5,347,334 or a cartridge having a double exposure preventive function is preferably used.

A cartridge where the film can be easily loaded by merely inserting the film into the cartridge described in JP-A-6-85128 may also be used.

The thus-manufactured film cartridge may be used for photographing and development to satisfy the object or for various photographic enjoyments using a camera, a developing machine or a lab. machine which will be described below.

The film cartridge (patrone) can exert its function satisfactorily when, for example, a camera in a simple loading system described in JP-A-6-8886 and JP-A-6-99908, a camera having an automatic winding-up system described in JP-A-6-57398 and JP-A-6-101135, a camera where the film can be taken out and the kind of film can be exchanged on the way of photographing described in JP-A-6-205690, a camera where the photographing information such as panorama photographing, high-vision photographing or normal photographing (availability of magnetic recording with the selection of the print aspect ratio) can be magnetic recorded on the film described in JP-A-5-293138 and JP-A-5-283382, a camera having a double exposure preventive function described in JP-A-6-101194 or a camera having a function to indicate the use state, for example, of the film described JP-A-5-150577, is used.

Thus photographed film may be processed in an automatic developing machine described in JP-A-6-222514 and JP-A-6-222545 and before, during or after the processing, the method of using the magnetic recording on the film described in JP-A-6-95265 and JP-A-4-123054 may be used or the aspect ratio selection function described in JP-A-5-19364 may be used.

In developing the film, if it is a cine-type development, the film is spliced according to the method described in JP-A-5-119461 before the processing.

During or after the development, the film may be subjected to attaching/detaching treatment described in JP-A-6-148805.

After the processing as above, the film information may be converted into a print through back printing or front printing on a color paper according to the method described in JP-A-2-184835, JP-A-4-186335 and JP-A-6-79968.

Further, the film may be returned to the user together with the index print and the cartridge for return described in JP-A-5-11353 and JP-A-5-232594.

The present invention is described below in greater detail with reference to examples, but the present invention should not be construed as being limited to these examples.

EXAMPLE 1

Synthesis of Compound (I-2)

Compound (I-2) was synthesized through the route in the following scheme:

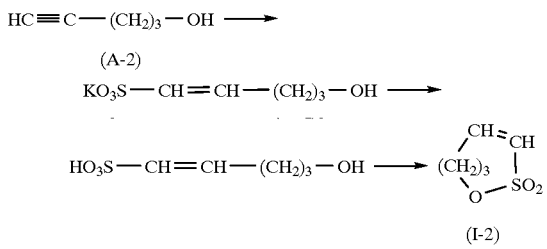

(I-2)

52 ml of an aqueous 3.98N KOH solution was added to 24 g of $K_2S_2O_5$ and 175 ml of water, further thereto 52 g of $K_2S_2O_5$ was added, and the mixture was stirred at room temperature. Then, 50.25 g (0.597 mol) of (A-2)/175 ml of water were added dropwise over 10 minutes. The resulting mixed solution was further vigorously stirred at an outer temperature of 35° C. for 11 hours while blowing air thereinto. Subsequently, water was distilled off under reduced pressure, 70 ml of concentrated hydrochloric acid was added to the colorless powder obtained and the mixture was heated for 10 minutes in a steam bath. After adding thereto 35 ml of ethanol, the mixed solution was water-cooled and the precipitate was separated by suction filtration and washed with 50 ml of concentrated hydrochloric acid/25 ml of ethanol. After distilling off the filtrate under reduced pressure, the pressure was further reduced (from 1 to 2 mmHg) by a vacuum pump and cyclization by dehydration was performed at an outer temperature of 130° C. After 30 minutes, 500 ml of ethyl acetate/350 ml of water were added for extraction and the ethyl acetate layer was twice washed with an aqueous $NaHCO_3$ solution to neutralize. The ethyl acetate layer was dried over magnesium sulfate and the solvent was distilled off under reduced pressure to obtain 4.7 g of Compound (I-2) as a colorless liquid (yield: 5.3%).

EXAMPLE 2

Synthesis of Compound (I-1)

Compound (I-1) as a colorless powder was obtained in the same manner as in Example 1 except for using (A-1) in place of (A-2) (yield: 18.6%, melting point: 57–59° C.).

EXAMPLE 3

Synthesis of Compound (II-12):

5 g (0.024 mol) of 5-bromo-2-methylbenzoxazole and 3.16 g (0.024 mol) of Compound (I-1) were stirred under heating on an oil bath at 150° C. for 7 hours. While stirring the reaction solution, 50 ml of ethyl acetate was added and after the reaction solution reached room temperature, the crystals obtained were separated by suction filtration and dried to obtain 5.7 g of Compound (II-12) as a colorless powder (yield: 69%, melting point: 200° C. or higher (decomposed)).

EXAMPLE 4

Synthesis of Compound (II-4)

Compound (II-14) as a colorless powder was obtained in the same manner as in Example 3 except for using 5-iodo-2-methylbenzoxazole in place of 5-bromo-2-methylbenzoxazole (yield: 75%, melting point: 200° C. or hither (decomposed)).

EXAMPLE 5

Synthesis of Compound (II-10)

Compound (II-10) as a colorless powder was obtained in the same manner as in Example 3 except for using 5,6-benzo-2-methylbenzoxazole in place of 5-bromo-2-methylbenzoxazole (yield: 81%, melting point: 200° C. or hither (decomposed)).

EXAMPLE 6

Synthesis of Compound (II-11)

Compound (II-11) as a colorless powder was obtained in the same manner as in Example 3 except for using 5,6-benzo-2-methylbenzoxazole in place of 5-bromo-2-methylbenzoxazole and using (I-2) in place of (I-1) (yield: 78%, melting point: 200° C. or hither (decomposed)).

EXAMPLE 7

Synthesis of Compound (III-12)

2.72 g (0.0082 mol) of Compound (II-11), 6.6 ml (0.033 mol) of ethyl orthopropionate, 3.3 ml of acetic acid and 8 ml of pyridine were stirred under heating on an oil bath at 135° C. for 1.5 hours. The reaction solution was water-cooled while stirring and 30 ml of acetone was added. The crystals obtained were separated by suction filtration and then dissolved in 50 ml of methanol while heating under reflux. After the spontaneous filtration, 50 ml of isopropanol was added to the filtrate and 40 ml of the solvent was distilled off under normal pressure. The residue was allowed to stand and then the crystals precipitated were separated by suction filtration to obtain 0.76 g of Compound (III-12) as a red powder (yield: 23%, $\lambda$max=515 nm, $\epsilon$=181,000 (methanol), melting point: 185–187° C.).

EXAMPLE 8

Synthesis of Compound (III-11)

Compound (III-11) as a red powder was obtained in the same manner as in Example 7 except for using Compound (II-10) in place of Compound (II-11) (yield: 62%, $\lambda$max=516 nm, $\epsilon$=196,000 (methanol), melting point: 210–212° C.).

EXAMPLE 9

Synthesis of Compound (III-9)

8.59 g (0.022 mol) of Compound (II-14), 17.6 ml (0.087 mol) of ethyl orthopropionate, 13.5 ml of acetic acid and 27 ml of pyridine were stirred under heating on an oil bath at 110° C. for 1.5 hours. The reaction solution was water-cooled while stirring and 100 ml of acetone was added thereto. The crystals obtained were separated by suction filtration and then dissolved in 50 ml of methanol while heating under reflux. After spontaneous filtration followed by leaving to stand, the crystals precipitated were separated by suction filtration and dried to obtain 1.58 g of Compound (III-9) as a red orange powder (yield: 15%, $\epsilon$max=502 nm, $\epsilon$=112,000 (methanol), melting point: 130–133° C.).

EXAMPLE 10

Synthesis of Compound (III-7)

Compound (III-7) as a red orange powder was obtained in the same manner as in Example 9 except for performing the reaction and purification using Compound (II-12) in place of Compound (II-14) and finally changing the counter ion to sodium salt using sodium acetate (yield: 26%, λmax=500 nm, $\epsilon$=158,000 (methanol), melting point: 250° C. or higher).

EXAMPLE 11

(1) Preparation of Emulsion

To an aqueous solution containing gelatin having an average molecular weight of 15,000 (containing 1,200 ml of water, 7.0 g of gelatin and 4.5 g of KBr) kept at 30° C. and under stirring, an aqueous 1.9M $AgNO_3$ solution and an aqueous 1.9M KBr solution were added by a double jet method each at a rate of 25 ml/min over 70 seconds to obtain nuclei of tabular grains. To 400 ml of this emulsion as seed crystals, 650 ml of an aqueous inactive gelatin solution (containing 20 g of gelatin and 1.2 g of KBr) was added, and the emulsion was ripened by raising the temperature to 75° C. for 40 minutes. Then, an aqueous $AgNO_3$ solution (containing 1.7 g of $AgNO_3$) was added over 1 minute and 30 seconds, subsequently, 7.0 ml of an aqueous $NH_4NO_3$ (50 wt %) solution and 7.0 ml of $NH_3$ (25 wt %) were added, and the emulsion was further ripened for 40 minutes.

The emulsion was adjusted to have a pH of 7 by $HNO_3$ (3N) and after adding 1.0 g of KBr thereto, while keeping the pAg at 7.9, 366.5 ml of an aqueous 1.9M $AgNO_3$ solution and an aqueous KBr solution were added, subsequently, 53.6 ml of an aqueous 1.9M $AgNO_3$ solution and an aqueous KBr (containing 33.3 mol % of KI) solution were added, and then 160.5 ml of an aqueous 1.9M $AgNO_3$ solution and an aqueous KBr solution were added to obtain Emulsion 1.

Emulsion 1 obtained was a triple structure grain where the intermediate shell had a region highest in the silver iodide content, and had an average aspect ratio of 2.8, an occupation ratio of tabular grains having an aspect ratio of 3 or more in the entire projected area of 26%, a coefficient of variation of the grain size of 7% and an average grain size, in terms of the sphere-corresponding diameter, of 0.98 μm.

Emulsion 1 was desalted by a usual flocculation method and after adding a sensitizing dye per mol of silver, subjected to optimal gold, sulfur and selenium sensitization in the presence of the dye.

(2) Preparation of Coated Sample

On a triacetyl cellulose film support having provided thereon an undercoat layer, an emulsion layer and a protective layer shown in Table 1 were coated to prepare Samples 101 to 112.

TABLE 1

(1) Emulsion layer

| | |
|---|---|
| Emulsion: Emulsion 1 (the dye used is shown in Table 2) | (as silver: 2.1 × $10^{-2}$ mol/m$^2$) |
| Coupler | (1.5 × $10^{-3}$ mol/m$^2$) |

[Chemical structure: tC$_5$H$_{11}$—(phenyl with tC$_5$H$_{11}$)—OCH(C$_2$H$_5$)CONH—(phenyl)—CONH—(pyrazolone with N-(2,4,6-trichlorophenyl))]

| | |
|---|---|
| Tricresyl phosphate | (1.10 g/m$^2$) |
| Gelatin | (2.30 g/m$^2$) |

(2) Protective layer

| | |
|---|---|
| 2,4-Dichloro-6-hydroxy-s-triazine sodium salt | (0.08 g/m$^2$) |
| Gelatin | (1.80 g/m$^2$) |

These samples each was subjected to exposure (1/100 second) for sensitometry and then color developed through the following steps.

Processing Method:

| Step | Processing Time | Processing Temperature (° C.) | Replenishing Amount (ml) | Tank Volume (l) |
|---|---|---|---|---|
| Color development | 2 min 45 sec | 38 | 33 | 20 |
| Bleaching | 6 min 30 sec | 38 | 25 | 40 |
| Water washing | 2 min 10 sec | 24 | 1,200 | 20 |
| Fixing | 4 min 20 sec | 38 | 25 | 30 |

Processing Method:

| Step | Processing Time | Processing Temperature (° C.) | Replenishing Amount (ml) | Tank Volume (l) |
|---|---|---|---|---|
| Water washing (1) | 1 min 05 sec | 24 | countercurrent piping system from (2) to (1) | 10 |
| Water washing (2) | 1 min 00 sec | 24 | 1,200 | 10 |
| Stabilization | 1 min 05 sec | 38 | 25 | 10 |
| Drying | 4 min 20 sec | 55 | | |

Replenishing amount was per 1 m of 35 mm-width light-sensitive material.

The composition of each processing solution is shown below.

| | Mother Solution (g) | Replenisher (g) |
|---|---|---|
| (Color Developer) | | |
| Diethylenetriaminepentaacetic acid | 1.0 | 1.1 |
| 1-Hydroxyethylidene-1,1-diphosphonic acid | 3.0 | 3.2 |
| Sodium sulfite | 4.0 | 4.4 |
| Potassium carbonate | 30.0 | 37.0 |
| Potassium bromide | 1.4 | 0.7 |
| Potassium iodide | 1.5 mg | — |
| Hydroxylamine sulfate | 2.4 | 2.8 |
| 4-[N-Ethyl-N-β-hydroxyethylamino]-2-aniline sulfate | 4.5 | 5.5 |
| Water to make | 1.0 l | 1.0 l |
| pH | 10.05 | 10.05 |
| (Bleaching Solution) | | |
| Sodium ethylenediaminetetraacetato ferrate trihydrate | 100.0 | 120.0 |
| Disodium ethylenediaminetetraacetate | 10.0 | 11.0 |
| Ammonium bromide | 140.0 | 160.0 |
| Ammonium nitrate | 30.0 | 35.0 |
| Aqueous ammonia (27%) | 6.5 ml | 4.0 ml |
| Water to make | 1.0 l | 1.0 l |
| pH | 6.0 | 5.7 |
| (Fixing solution) | | |
| Sodium ethylenediaminetetraacetate | 0.5 | 0.7 |
| Sodium sulfite | 7.0 | 8.0 |
| Sodium bisulfite | 5.0 | 5.5 |
| Aqueous ammonium thiosulfate | 170.0 ml | 200.0 ml |
| solution (70%) | | |
| Water to make | 1.0 l | 1.0 l |
| pH | 6.7 | 6.6 |
| (Stabilizing Solution) | | |
| Formalin (37%) | 2.0 ml | 3.0 ml |
| Polyoxyethylene-p-monononylphenyl ether (polymerization degree: 10) | 0.3 | 0.45 |
| Disodium ethylenediaminetetraacetate | 0.05 | 0.08 |
| Water to make | 1.0 l | 1.0 l |
| pH | 5.8–8.0 | 5.8–8.0 |

The processed samples each was determined on the density through a green filter and evaluated on the fog.

The sensitivity is defined as the reciprocal of the exposure amount necessary for giving a density 0.2 higher then the fog density, and the sensitivity of each sample is shown by a relative value to the sensitivity of Sample 101 taken as 100. The kind of emulsions and methine compounds used in each sample and the results obtained on determination of the sensitivity of samples are shown in Table 2.

Further, unexposed films each was aged at 60° C. and a relative humidity of 60% for 7 days and then subjected to the exposure, development and evaluation on the sensitivity in the same manner. The results obtained are also shown in Table 2.

TABLE 2

| Sample No. | Compound | Addition Amount (mol/Ag-mol) | Fresh Sensitivity | Fog | Sensitivity after Storage[1] | Remarks |
|---|---|---|---|---|---|---|
| 101 | (S-1) | 4.0 × 10⁻⁴ | 100 (control) | 0.25 | 54 | Comparison |
| 102 | (III-3) | " | 122 | 0.15 | 102 | Invention |
| 103 | (III-4) | " | 151 | 0.15 | 141 | " |
| 104 | (S-2) | " | 120 | 0.20 | 53 | Comparison |
| 105 | (III-7) | " | 135 | 0.16 | 110 | Invention |
| 106 | (III-8) | " | 155 | 0.15 | 141 | " |
| 107 | (S-3) | " | 115 | 0.31 | 45 | Comparison |
| 108 | (III-11) | " | 138 | 0.17 | 125 | Invention |
| 109 | (III-12) | " | 153 | 0.15 | 147 | " |
| 110 | (S-4) | " | 118 | 0.25 | 48 | Comparison |

TABLE 2-continued

| 111 | (III-15) | " | 150 | 0.15 | 123 | Invention |
|---|---|---|---|---|---|---|
| 112 | (III-16) | " | 185 | 0.14 | 173 | " |
| 113 | (S-5) | " | 120 | 0.20 | 45 | Comparison |
| 114 | (III-18) | " | 155 | 0.14 | 136 | Invention |
| 115 | (S-5) + (SS-1) | $4.0 \times 10^{-4} + 1 \times 10^{-3}$ | 121 | 0.20 | 45 | Comparison |
| 116 | (S-5) + (II-16) | " | 133 | 0.17 | 102 | Invention |
| 117 | (S-5) + (II-17) | " | 135 | 0.16 | 104 | " |

1) at 60° C. and 60% for 7 days (S-1)

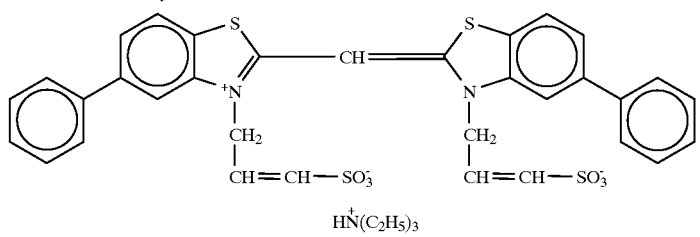

(S-2)

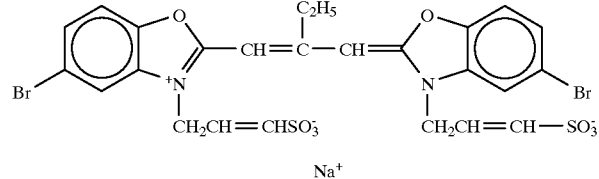

(S-3)

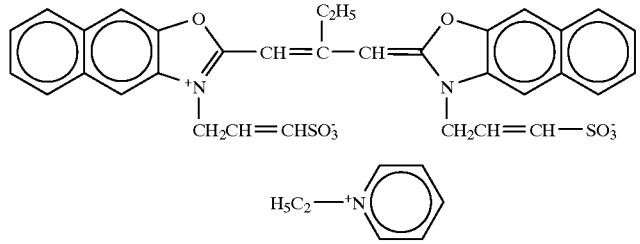

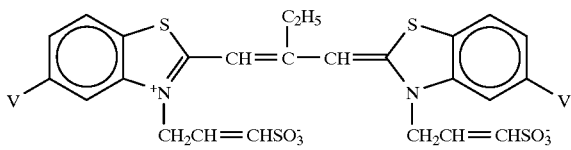

(S-4)  V = Cl
(S-5)  V = $CH_3$ (SS-1)

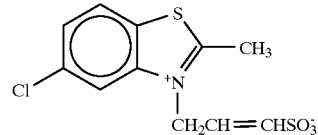

It is seen from Table 2 that the compounds of the present invention provided effects of higher fresh sensitivity and smaller reduction in the sensitivity after storage, as compared with the comparative compounds.

EXAMPLE 12

A tabular silver iodobromide emulsion was prepared in the same manner as Emulsion D in Example 5 of JP-A-8-29904 and designated as Emulsion 2.

Multi-layer color light-sensitive materials were prepared in the same manner as Sample 101 in Example 5 of JP-A-8-29904 except for replacing Emulsion D in the fifth layer of Sample 101 in Example 5 of JP-A-8-29904 by Emulsion 2 and replacing ExS-1, ExS-2 and ExS-3 by Sensitizing Dye (S-5) or Sensitizing Dye (III-18) added in an amount of $5.0 \times 10^{-4}$ mol per mol of silver halide, and the samples obtained were designated as Sample 201 and Sample 202.

In order to examine the sensitivity, the thus-obtained samples each was exposed to light of Fuji Model FW Sensitometry (manufactured by Fuji Photo Film Co., Ltd.) through an optical wedge and a red filter for $1/100$ second, color developed using the same processing steps and processing solutions as in Example 1 of JP-A-8-29904, and determined on the cyan density. The sensitivity is shown by a relative value for (fog density)+0.2.

As a result, Sample 202 of the present invention had high sensitivity of 141 relative to the sensitivity 100 (control) of Comparative Sample 201.

EXAMPLE 13

Tetradecahedral silver iodobromide emulsions were prepared in the same manner as Emulsion 1 in Example 1 of JP-A-7-92601 except for replacing the spectral sensitizing dye by Sensitizing Dye (S-1) or Sensitizing Dye (III-4) added in an amount of $8 \times 10^{-4}$ mol per mol of silver halide, and the emulsions prepared were designated as Emulsion 301 and Emulsion 302. Further, cubic silver iodobromide emulsions were prepared in the same manner as Emulsion 1 in Example 1 of JP-A-7-92601 except for changing the silver potential during the second double jet addition from +65 mV to +115 mV and replacing the spectral sensitizing dye by Sensitizing Dye (S-1) or Sensitizing Dye (III-4) added in an amount of $8 \times 10^{-4}$ mol per mol of silver halide, and the emulsions prepared were designated as Emulsion 303 and Emulsion 304.

Multi-layer color light-sensitive materials were prepared in the same manner as Sample 401 in Example 4 of JP-A-7-92601 except for replacing Emulsion J in the fifteenth layer of Sample 401 in Example 4 of JP-A-7-92601 by Emulsion 301 or Emulsion 302, and the samples obtained were designated as Sample 311 and Sample 312. In the same manner, Samples 313 and 314 were prepared by replacing Emulsion J in the fifteenth layer of Sample 401 in Example 4 of JP-A-7-92601 by Emulsion 303 or Emulsion 304.

The thus-obtained samples were evaluated on the sensitivity. These samples each was subjected to $\frac{1}{50}$ second exposure, color reversal development and determination of yellow density, in the same manner as in Example 4 of JP-A-7-92601. The sensitivity is shown by a relative value taking the sensitivity of Sample 311 as 100 after obtaining a reciprocal of the exposure amount necessary for giving a density of (a minimum density obtained upon sufficient exposure)+0.2. As a result thereof, Sample 312 of the present invention had high sensitivity of 151. In the same manner, Sample 314 of the present invention had high sensitivity of 155 relative to the sensitivity of Comparative Sample 313 taken as 100.

EXAMPLE 14

An octahedral silver bromide internal latent image-type directive positive emulsion and a hexagonal tabular silver bromide internal latent image-type direct positive emulsion were prepared in the same manner as Emulsion 1 and Emulsion 5 in Example 1 of JP-A-5-313297, respectively, and the emulsions prepared were designated as Emulsion 401 and Emulsion 402.

Color diffusion transfer photographic films were prepared in the same manner as Sample 101 in Example 1 of JP-A-5-313297 except for replacing Emulsion 2 and Sensitizing Dye (2) in the eleventh layer of Sample 101 in Example 1 of JP-A-5-313297 by Emulsion 401 and Sensitizing Dye (S-2) or Sensitizing Dye (III-8), respectively, and the samples obtained were designated as Sample 411 and Sample 412. In the same manner, Samples 413 and 414 were prepared by replacing Emulsion 2 and Sensitizing Dye (2) in the eleventh layer of Sample 101 in Example 1 of JP-A-5-313297 by Emulsion 402 and Sensitizing Dye (S-3) or Sensitizing dye (III-12), respectively, where Sensitizing Dye (S-2), (S-3), (III-8) or (III-12) was added in an amount of $9 \times 10^{-4}$ mol per mol of silver halide.

In order to examine the sensitivity, the thus-obtained samples each was processed using the same processing steps and processing solutions as in Example 1 of JP-A-5-313297, and determined on the transfer density using a color densitometer. The sensitivity is shown by a relative value for density of 1.0. Sample 412 of the present invention had high sensitivity of 135 relative to the sensitivity of Comparative Sample 411 taken as 100. Further, Sample 414 of the present invention had high sensitivity of 137 relative to the sensitivity of Comparative Sample 413 taken as 100.

EXAMPLE 15

Silver chlorobromide emulsions were prepared in the same manner as Emulsion F in Example 2 of JP-A-4-142536 except for not adding Red-Sensitive Sensitizing Dye (S-1) before sulfur sensitization, using chloroauric acid in combination to effect optimal gold-sulfur sensitization in addition to sulfur sensitization of triethylthiourea, and adding Sensitizing Dye (S-1) (comparative dye of the present invention) or Sensitizing Dye (III-4) after gold-sulfur sensitization in an amount of $2 \times 10^{-4}$ mol per mol of silver halide, and the emulsions prepared were designated as Emulsion 501 and Emulsion 502.

Multi-layer color printing papers were prepared in the same manner as Sample 20 in Example 1 of JP-A-6-347944 except for replacing the emulsion in the first layer of Sample 20 in Example 1 of JP-A-6-347944 by Emulsion 501 or Emulsion 502, and the samples obtained were designated as Sample 511 and Sample 512.

In order to examine the sensitivity, the thus-obtained samples each was exposed to light of Fuji Model FW Sensitometry (manufactured by Fuji Photo Film Co., Ltd.) through an optical wedge and a blue filter for $\frac{1}{10}$ second, and color developed using the same processing steps and processing solutions as in Example 1 of JP-A-6-347944. As a result, Sample 512 of the present invention had high sensitivity of 131 relative to the sensitivity of Comparative Sample 511 taken as 100.

EXAMPLE 16

Tabular silver chlorobromide emulsions were prepared in the same manner as Emulsion A in Example 1 of JP-A-8-122954 except that the chemical sensitization was performed using Sensitizing Dye (S-2) or Sensitizing Dye (III-8) added in an amount of $2 \times 10^{-4}$ mol per mol of silver halide, in place of Sensitizing Dyes 1 and 2 in Chemical Sensitization (B) in Example 1 of JP-A-8-122954, and the emulsions prepared were designated as Emulsion 601 and Emulsion 602.

Coated Samples 611 and 612 were prepared by coating an emulsion layer and a surface protective layer in combination by the co-extrusion method on both surfaces of a support in the same manner as in Example 1 of Japanese Patent Application No. 7-232036 (JP-A-8-122954) except for replacing the emulsion in Example 1 of Japanese Patent Application No. 7-232036 by Emulsion 601 or Emulsion 602. The coated silver amount per one surface was 1.75 $g/m^2$.

In order to examine the sensitivity, the thus-obtained samples each was subjected to exposure from both sides for 0.05 second using an X-ray orth screen HGM manufactured by Fuji Photo Film Co., Ltd., and then processed using the same automatic developing machine and processing solutions as used in Example 1 of Japanese Patent Application No. 7-232036. The sensitivity is expressed by a logarithm of the reciprocal of the exposure amount necessary for giving a density of fog+0.1 and shown by a relative value to the sensitivity of Sample 611 taken as 100. As a result, Sample 612 of the present invention had high sensitivity of 126.

Similar effects could be obtained even when the exposure was performed using HR-4 or HGH in place of X-ray ortho screen HGM.

EXAMPLE 17

A tabular silver chloride emulsion was prepared in the same manner as Emulsion D in Example 2 of Japanese Patent Application No. 7-146891 (JP-A-8-227117) except for not adding Sensitizing Dyes 2 and 3, and the emulsion prepared was designated as Emulsion 701.

Coated samples were prepared in the same manner as Coated Sample F in Example 3 of Japanese Patent Application No. 7-146891 except for replacing Emulsion F and Sensitizing Dye 1 of Coated Sample F in Example 3 of Japanese Patent Application No. 7-146891 by Emulsion 701 and Sensitizing Dye (S-1) or Sensitizing Dye (III-4), respectively, where Sensitizing Dye (S-1) or (III-4) was added in an amount of $5 \times 10^{-4}$ mol per mol of silver halide. The samples obtained were designated as Sample 711 and Sample 712.

In order to examine the sensitivity, the thus-obtained samples each was exposed to light of Fuji Model FW Sensitometry (manufactured by Fuji Photo Film Co., Ltd.) through an optical wedge and a blue filter for $1/100$ second, subjected to Fuji Photo Film CN16 processing, and determined on the photographic properties.

The sensitivity is expressed by a logarithm of the reciprocal of the exposure amount necessary for giving a density of fog+0.2 and the sensitivity of Sample 711 was taken as 100. Sample 712 of the present invention had high sensitivity of 135.

EXAMPLE 18

An octahedral silver chloride emulsion was prepared in the same manner as Emulsion F in Example 3 of Japanese Patent Application No. 7-146891 (JP-A-8-227117) and the emulsion prepared was designated as Emulsion 801.

Coated samples were prepared in the same manner as Coated Sample F in Example 3 of Japanese Patent Application No. 7-146891 except for replacing Emulsion F and Sensitizing Dye 1 of Coated Sample F in Example 3 of Japanese Patent Application No. 7-146891 by Emulsion 801 and Sensitizing Dye (S-3) or Sensitizing Dye (III-12), respectively, where Sensitizing Dye (S-3) or (III-12) was added in an amount of $5 \times 10^{-4}$ mol per mol of silver halide. The samples obtained were designated as Sample 811 and Sample 812.

In order to examine the sensitivity, the thus-obtained samples each was exposed to light of Fuji Model FW Sensitometry (manufactured by Fuji Photo Film Co., Ltd.) through an optical wedge and a green filter for $1/100$ second, subjected to Fuji Photo Film CN16 processing, and determined on the photographic properties.

The sensitivity is expressed by a logarithm of the reciprocal of the exposure amount necessary for giving a density of fog+0.2 and the sensitivity of Sample 811 was taken as 100. Sample 812 of the present invention had high sensitivity of 155.

EXAMPLE 19

Synthesis of Compound (I'-1)

Compound (I'-1) was synthesized through the route in the following scheme:

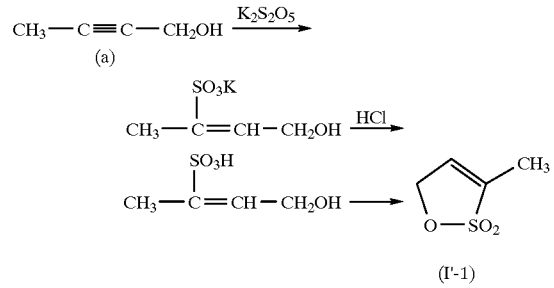

64 ml of an aqueous 3.98N KOH solution was added to 30 g of $K_2S_2O_5$ and 215 ml of water, further thereto 64 g of $K_2S_2O_5$ was added, and the mixture was stirred at room temperature. Then, 52 g (0.742 mol) of (a)/215 ml of water were added dropwise over 10 minutes. The resulting mixed solution was further vigorously stirred at an outer temperature of 35° C. for 10 hours while blowing air thereinto. Subsequently, water was distilled off under reduced pressure, 86 ml of concentrated hydrochloric acid was added to the colorless powder obtained and the mixture was heated for 15 minutes in a steam bath. After adding thereto 43 ml of ethanol, the mixed solution was water-cooled and the precipitate was separated by suction filtration and washed with 128 ml of concentrated hydrochloric acid/64 ml of ethanol. After distilling off the filtrate under reduced pressure, the pressure was further reduced (about 4 mmHg) by a vacuum pump and cyclization by dehydration was performed at an outer temperature of 130° C. After 30 minutes, 500 ml of ethyl acetate/350 ml of water were added for extraction and the ethyl acetate layer was twice washed with an aqueous $NaHCO_3$ solution to neutralize. The ethyl acetate layer was dried over magnesium sulfate, the solvent was distilled off under reduced pressure, 20 ml of hexane was added, and the crystals precipitated were separated by suction filtration. Then, the crystals were dried to obtain 0.55 g of Compound (I'-1) as a colorless powder (yield: 0.55%, melting point: 36–38° C.).

EXAMPLE 20

Synthesis of Compound (I'-2)

Compound (I'-2) was synthesized through the route in the following scheme:

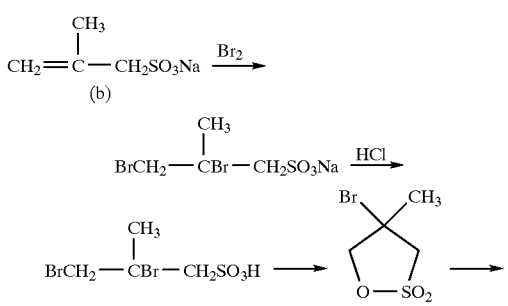

-continued

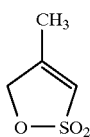

(I'-2)

To 25 g (0.158 mol) of Compound (b) and 100 ml of water under ice cooling and stirring, 25.3 g of bromine was added dropwise over 5 minutes. After further stirring for 2 hours, water was distilled off under reduced pressure. To the colorless powder obtained, 600 ml of ethanol was added and completely dissolved by heating under reflux, followed by water cooling. Then, 16 ml of concentrated hydrochloric acid was added and 400 ml of methanol was distilled off under reduced pressure. The inorganic salt precipitated was separated by suction filtration and the filtrate was distilled off under reduced pressure. The pressure was further reduced (about 1 mmHg) by a vacuum pump and cyclization by dehydration was performed at an outer temperature of 160° C. for 1 hour. Thereafter, 100 ml of ethyl acetate/100 ml of water were added for extraction and the ethyl acetate layer was twice washed with an aqueous $NaHCO_3$ solution to neutralize. The ethyl acetate layer was dried over magnesium sulfate, the solvent was distilled off under reduced pressure, 2 ml of toluene was added to the oil obtained, 0.1 ml of triethylamine was added, and the inorganic salt precipitated was separated by suction filtration. The filtrate was distilled off under reduced pressure and then, 0.07 g of Compound (I'-2) was obtained as a colorless liquid (yield: 0.33%).

EXAMPLE 21

Synthesis of Compound (II'-8)

0.84 g (0.0037 mol) of 5-phenyl-2-methylbenzothiazole and 0.5 g (0.0037 mol) of Compound (I'-1) were stirred under heating on an oil bath at 120° C. for 2.5 hours. While stirring the reaction solution, 20 ml of ethyl acetate was added and after the reaction solution reached room temperature, the crystals obtained were separated by suction filtration and dried to obtain 0.4 g of Compound (II'-8) as a colorless powder (yield: 30%, melting point: 200° C. or higher (decomposed)).

EXAMPLE 22

Synthesis of Compound (II'-2)

Compound (II'-2) as a colorless powder was obtained in the same manner as in Example 22 except for using 5-bromo-2-methylbenzoxazole in place of 5-phenyl-2-methylbenzoxazole (yield: 25%, melting point: 200° C. or higher (decomposed)).

EXAMPLE 23

Synthesis of Compound (III'-1)

0.4 g (0.0011 mol) of Compound (II'-8), 6 ml of acetonitrile and 1.5 ml (0.0108 mol) of triethylamine were stirred on an oil bath at 80° C., 0.12 g (0.00059 mol) of 2,4-dinitrochlorobenzene/2 ml of acetonitrile were added, and the mixture was further stirred under heating for 1 hour. The reaction solution was allowed to cool, 10 ml of acetonitrile was added thereto, and the crystals obtained were separated by suction filtration. The crystals were then dissolved in 35 ml of methanol/35 ml of acetonitrile while heating under reflux. After the spontaneous filtration, 30 ml of the solvent was distilled off under normal pressure. The residue was allowed to stand and the crystals precipitated were separated by suction filtration and dried to obtain 0.2 g of Compound (III'-1) as a yellow powder (yield: 45%, $\lambda max=437$ nm, $\epsilon=105,000$ (methanol), melting point: 280° C. or higher (decomposed)).

EXAMPLE 24

Synthesis of Compound (III'-4)

Compound (III'-4) as a yellow powder was obtained in the same manner as in Example 23 except for using Compound (II'-5) in place of Compound (II'-8) (yield by volume: 0.2 g, yield: 45%, $\lambda max=430$ nm, $\epsilon=83,000$ (methanol), melting point: 280° C. or higher (decomposed)).

EXAMPLE 25

An emulsion and coated samples were prepared in the same manner as in Example 11 except for using the compound shown in Table 3, and the samples obtained were designated as Samples 101' to 115'.

These samples each was subjected to color development and then evaluation on the fresh sensitivity and fog in the same manner as in Example 11. The results obtained are shown in Table 3.

TABLE 3

| Sample No. | Compound | Addition Amount (mol/Ag-mol) | Fresh Sensitivity | Fog | Sensitivity after Storage[1] | Remarks |
|---|---|---|---|---|---|---|
| 101' | (S-1) | $4 \times 10^{-4}$ | 100 (control) | 0.25 | 54 | Comparison |
| 102' | (III'-2) | " | 121 | 0.15 | 101 | Invention |
| 103' | (III'-1) | " | 143 | 0.15 | 135 | " |
| 104' | (S-2) | " | 120 | 0.20 | 53 | Comparison |
| 105' | (III'-7) | " | 151 | 0.16 | 138 | Invention |
| 106' | (S-3) | " | 115 | 0.31 | 45 | Comparison |
| 107' | (III'-9) | " | 145 | 0.15 | 137 | Invention |
| 108' | (S-4) | " | 118 | 0.25 | 48 | Comparison |
| 109' | (III'-11) | " | 151 | 0.15 | 123 | Invention |
| 110' | (III'-10) | " | 183 | 0.13 | 165 | " |
| 111' | (S-5) | " | 120 | 0.20 | 45 | Comparison |
| 112' | (III'-12) | " | 151 | 0.15 | 131 | Invention |
| 113' | (S-5) + (SS-1) | $4 \times 10^{-4} + 1 \times 10^{-3}$ | 121 | 0.20 | 45 | Comparison |

TABLE 3-continued

| Sample No. | Compound | Addition Amount (mol/Ag-mol) | Fresh Sensitivity | Fog | Sensitivity after Storage[1] | Remarks |
|---|---|---|---|---|---|---|
| 114' | (S-5) + (II'-6) | " | 131 | 0.18 | 100 | Invention |
| 115' | (S-5) + (II'-5) | " | 133 | 0.17 | 105 | " |

[1]at 60° C. and 60% for 7 days

It is seen from Table 3 that the compounds of the present invention provided effects of lower fog, higher fresh sensitivity and smaller reduction in the sensitivity after storage, as compared with the comparative compounds.

EXAMPLE 26

A tabular silver iodobromide emulsion was prepared in the same manner as Emulsion D in Example 5 of JP-A-8-29904 and designated as Emulsion 2.

Multi-layer color light-sensitive materials were prepared in the same manner as Sample 101 in Example 5 of JP-A-8-29904 except for replacing Emulsion D in the fifth layer of Sample 101 in Example 5 of JP-A-8-29904 by Emulsion 2 and replacing ExS-1, ExS-2 and ExS-3 by Sensitizing Dye (S-5) or Sensitizing Dye (III'-12) added in an amount of $5.0 \times 10^{-4}$ mol per mol of silver halide, and the samples obtained were designated as Sample 201' and Sample 202'.

In order to examine the sensitivity, the thus-obtained samples each was exposed to light of Fuji Model FW Sensitometry (manufactured by Fuji Photo Film Co., Ltd.) through an optical wedge and a red filter for $1/100$ second, color developed using the same processing steps and processing solutions as in Example 1 of JP-A-8-29904, and determined on the cyan density. The sensitivity is shown by a relative value for (fog density)+0.2.

As a result, Sample 202' of the present invention had high sensitivity of 135 relative to the sensitivity 100 (control) of Comparative Sample 201'.

EXAMPLE 27

Tetradecahedral silver iodobromide emulsions were prepared in the same manner as Emulsion 1 in Example 1 of JP-A-7-92601 except for replacing the spectral sensitizing dye by Sensitizing Dye (S-1) or Sensitizing Dye (III'-1) added in an amount of $8 \times 10^{-4}$ mol per mol of silver halide, and the emulsions prepared were designated as Emulsion 301' and Emulsion 302'. Further, cubic silver iodobromide emulsions were prepared in the same manner as Emulsion 1 in Example 1 of JP-A-7-92601 except for changing the silver potential during the second double jet addition from +65 mV to +115 mV and replacing the spectral sensitizing dye by Sensitizing Dye (S-1) or Sensitizing Dye (III'-1) added in an amount of $8 \times 10^{-4}$ mol per mol of silver halide, and the emulsions prepared were designated as Emulsion 303' and Emulsion 304'.

Multi-layer color light-sensitive materials were prepared in the same manner as Sample 401 in Example 4 of JP-A-7-92601 except for replacing Emulsion J in the fifteenth layer of Sample 401 in Example 4 of JP-A-7-92601 by Emulsion 301' or Emulsion 302', and the samples obtained were designated as Sample 311' and Sample 312'. In the same manner, Samples 313' and 314' were prepared by replacing Emulsion J in the fifteenth layer of Sample 401 in Example 4 of JP-A-7-92601 by Emulsion 303' or Emulsion 304'.

The thus-obtained samples were evaluated on the sensitivity. These samples each was subjected to $1/50$ second exposure, color reversal development and determination of yellow density, in the same manner as in Example 4 of JP-A-7-92601. The sensitivity is shown by a relative value taking the sensitivity of Sample 311' as 100 after obtaining a reciprocal of the exposure amount necessary for giving a density of (a minimum density obtained upon sufficient exposure)+0.2. As a result thereof, Sample 312' of the present invention had high sensitivity of 145. In the same manner, Sample 314' of the present invention had high sensitivity of 151 relative to the sensitivity of Comparative Sample 313' taken as 100.

EXAMPLE 28

An octahedral silver bromide internal latent image-type directive positive emulsion and a hexagonal tabular silver bromide internal latent image-type direct positive emulsion were prepared in the same manner as Emulsion 1 and Emulsion 5 in Example 1 of JP-A-5-313297, respectively, and the emulsions prepared were designated as Emulsion 401' and Emulsion 402'.

Color diffusion transfer photographic films were prepared in the same manner as Sample 101 in Example 1 of JP-A-5-313297 except for replacing Emulsion 2 and Sensitizing Dye (2) in the eleventh layer of Sample 101 in Example 1 of JP-A-5-313297 by Emulsion 401' and Sensitizing Dye (S-2) or Sensitizing Dye (III'-7), respectively, and the samples obtained were designated as Sample 411' and Sample 412'. In the same manner, Samples 413' and 414' were prepared by replacing Emulsion 2 and Sensitizing Dye (2) in the eleventh layer of Sample 101 in Example 1 of JP-A-5-313297 by Emulsion 402' and Sensitizing Dye (S-3) or Sensitizing dye (III'-9), respectively, where Sensitizing Dye (S-2), (S-3), (III'-7) or (III'-9) was added in an amount of $9 \times 10^{-4}$ mol per mol of silver halide.

In order to examine the sensitivity, the thus-obtained samples each was processed using the same processing steps and processing solutions as in Example 1 of JP-A-5-313297, and determined on the transfer density using a color densitometer. The sensitivity is shown by a relative value for density of 1.0. Sample 412' of the present invention had high sensitivity of 130 relative to the sensitivity of Comparative Sample 411' taken as 100. Further, Sample 414' of the present invention had high sensitivity of 133 relative to the sensitivity of Comparative Sample 413' taken as 100.

EXAMPLE 29

Silver chlorobromide emulsions were prepared in the same manner as Emulsion F in Example 2 of JP-A-4-142536 except for not adding Red-Sensitive Sensitizing Dye (S-1) before sulfur sensitization, using chloroauric acid in combination to effect optimal gold-sulfur sensitization in addition to sulfur sensitization of triethylthiourea, and adding Sensitizing Dye (S-1) (comparative dye of the present invention) or Sensitizing Dye (III'-1) after gold-sulfur sensitization in an amount of $2\times10^{-4}$ mol per mol of silver halide, and the emulsions prepared were designated as Emulsion 501' and Emulsion 502'.

Multi-layer color printing papers were prepared in the same manner as Sample 20 in Example 1 of JP-A-6-347944 except for replacing the emulsion in the first layer of Sample 20 in Example 1 of JP-A-6-347944 by Emulsion 501' or Emulsion 502', and the samples obtained were designated as Sample 511' and Sample 512'.

In order to examine the sensitivity, the thus-obtained samples each was exposed to light of Fuji Model FW Sensitometry (manufactured by Fuji Photo Film Co., Ltd.) through an optical wedge and a blue filter for $\frac{1}{10}$ second, and color developed using the same processing steps and processing solutions as in Example 1 of JP-A-6-347944. As a result, Sample 512' of the present invention had high sensitivity of 121 relative to the sensitivity of Comparative Sample 511' taken as 100.

EXAMPLE 30

Tabular silver chlorobromide emulsions were prepared in the same manner as Emulsion A in Example 1 of JP-A-8-122954 except that the chemical sensitization was performed using Sensitizing Dye (S-2) or Sensitizing Dye (III'-7) added in an amount of $2\times10^{-4}$ mol per mol of silver halide, in place of Sensitizing Dyes 1 and 2 in Chemical Sensitization (B) in Example 1 of JP-A-8-122954, and the emulsions prepared were designated as Emulsion 601' and Emulsion 602'.

Coated Samples 611' and 612' were prepared by coating an emulsion layer and a surface protective layer in combination by the co-extrusion method on both surfaces of a support in the same manner as in Example 1 of Japanese Patent Application No. 7-232036 except for replacing the emulsion in Example 1 of Japanese Patent Application No. 7-232036 (JP-A-8-122954) by Emulsion 601' or Emulsion 602'. The coated silver amount per one surface was 1.75 g/m$^2$.

In order to examine the sensitivity, the thus-obtained samples each was subjected to exposure from both sides for 0.05 second using an X-ray orth screen HGM manufactured by Fuji Photo Film Co., Ltd., and then processed using the same automatic developing machine and processing solutions as used in Example 1 of JP-A-8-122954. The sensitivity is expressed by a logarithm of the reciprocal of the exposure amount necessary for giving a density of fog+0.1 and shown by a relative value to the sensitivity of Sample 611' taken as 100. As a result, Sample 612' of the present invention had high sensitivity of 125.

Similar effects could be obtained even when the exposure was performed using HR-4 or HGH in place of X-ray ortho screen HGM.

EXAMPLE 31

A tabular silver chloride emulsion was prepared in the same manner as Emulsion D in Example 2 of Japanese Patent Application No. 7-146891 (JP-A-8-227117) except for not adding Sensitizing Dyes 2 and 3, and the emulsion prepared was designated as Emulsion 701'.

Coated samples were prepared in the same manner as Coated Sample F in Example 3 of Japanese Patent Application No. 7-146891 except for replacing Emulsion F and Sensitizing Dye 1 of Coated Sample F in Example 3 of Japanese Patent Application No. 7-146891 by Emulsion 701' and Sensitizing Dye (S-1) or Sensitizing Dye (III'-1), respectively, where Sensitizing Dye (S-1) or (III'-1) was added in an amount of $5\times10^{-4}$ mol per mol of silver halide. The samples obtained were designated as Sample 711' and Sample 712'.

In order to examine the sensitivity, the thus-obtained samples each was exposed to light of Fuji Model FW Sensitometry (manufactured by Fuji Photo Film Co., Ltd.) through an optical wedge and a blue filter for $\frac{1}{100}$ second, subjected to Fuji Photo Film CN16 processing, and determined on the photographic properties.

The sensitivity is expressed by a logarithm of the reciprocal of the exposure amount necessary for giving a density of fog+0.2 and the sensitivity of Sample 711' was taken as 100. Sample 712' of the present invention had high sensitivity of 131.

EXAMPLE 32

An octahedral silver chloride emulsion was prepared in the same manner as Emulsion F in Example 3 of Japanese Patent Application No. 7-146891 and the emulsion prepared was designated as Emulsion 801'.

Coated samples were prepared in the same manner as Coated Sample F in Example 3 of Japanese Patent Application No. 7-146891 except for replacing Emulsion F and Sensitizing Dye 1 of Coated Sample F in Example 3 of Japanese Patent Application No. 7-146891 by Emulsion 801' and Sensitizing Dye (S-3) or Sensitizing Dye (III'-9), respectively, where Sensitizing Dye (S-3) or (III'-9) was added in an amount of $5\times10^{-4}$ mol per mol of silver halide. The samples obtained were designated as Sample 811' and Sample 812'.

In order to examine the sensitivity, the thus-obtained samples each was exposed to light of Fuji Model FW Sensitometry (manufactured by Fuji Photo Film Co., Ltd.) through an optical wedge and a green filter for $\frac{1}{100}$ second, subjected to Fuji Photo Film CN16 processing, and determined on the photographic properties.

The sensitivity is expressed by a logarithm of the reciprocal of the exposure amount necessary for giving a density of fog+0.2 and the sensitivity of Sample 811' was taken as 100. Sample 812' of the present invention had high sensitivity of 151.

The present invention provides novel compounds and production processes thereof and by using the compound of the present invention, a silver halide photographic light-sensitive material having high sensitivity and high storage stability can be obtained.

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive material comprising at least one silver halide emulsion layer on a support, and at least one quaternary salt compound represented by the following formula (II):

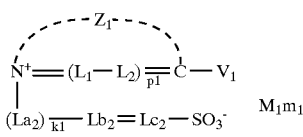

(II)

wherein $La_2$ represents a methylene group, $Lb_2$ and $Lc_2$ each represents a methine group, $k_1$ represents 2 or 3, $L_1$ and $L_2$ each represents a methine group, $V_1$ represents a hydrogen atom or a monovalent substituent, $Z_1$ represents an atomic group necessary for forming a 5- or 6-membered nitrogen-containing heterocyclic ring, $p_1$ represents 0 or 1, $M_1$ represents a counter ion for balancing the electric charge, and $m_1$ represents a number from 0 to 10 necessary for neutralizing the molecular charge;

and a methine compound represented by the following formula (III):

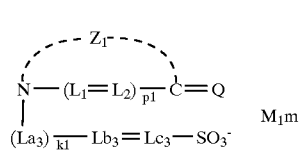

(III)

wherein $La_3$ represents a methylene group, $Lb_3$ and $Lc_3$ each represents a methine group, $k_1$ represents 2 or 3, $L_1$ and $L_2$ each represents a methine group, Q represents a methine group or polymethine group necessary for forming a methine dye, $Z_1$ represents an atomic group necessary for forming a 5- or 6-membered nitrogen-containing heterocyclic ring, $M_1$ represents a counter ion for balancing the electric charge, $m_1$ represents a number from 0 to 10 necessary for neutralizing the molecular charge, and $p_1$ represents 0 or 1.

2. A silver halide photographic light-sensitive material comprising at least one silver halide emulsion layer on a support, and a quaternary salt compound represented by the following formula (II'):

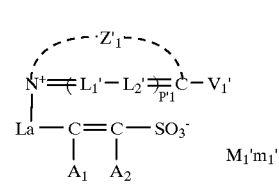

(II')

wherein $L_1'$ and $L_2'$ each represents a methine group, $V_1'$ represents a hydrogen atom or a monovalent substituent, $Z_1'$ represents an atomic group necessary for forming a 5- or 6-membered nitrogen-containing heterocyclic ring, $p_1'$ represents 0 or 1. $M_1'$ represents a counter ion for balancing the electric charge, $m_1'$ represents a number from 0 to 10 necessary for neutralizing the molecular charge, $A_1$ and $A_2$ each represents a hydrogen atom, an alkyl group, an aryl group or a heterocyclic group, provided that $A_1$ and $A_2$ are not a hydrogen atom at the same time, and La represents a methylene group, and/or a methine compound represented by the following formula (III'):

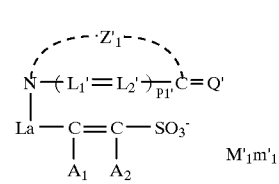

(III')

wherein Q' represents a methine group or polymethine group necessary for forming a methine dye, $L_1'$ and $L_2'$ each represents a methine group. $V_1'$ represents a hydrogen atom or a monovalent substituent, $Z_1'$ represents an atomic group necessary for forming a 5- or 6-membered nitrogen-containing heterocyclic ring, $p_1'$ represents 0 or 1, $M_1'$ represents a counter ion for balancing the electric charge, $m_1'$ represents a number from 0 to 10 necessary for neutralizing the molecular charge, $A_1$ and $A_2$ each represents a hydrogen atom, an alkyl group, an aryl group, or a heterocyclic group, provided that $A_1$ and $A_2$ are not a hydrogen atom at the same time, and La represents a methylene group.

* * * * *